United States Patent
Gurtowski

(10) Patent No.: US 10,027,731 B2
(45) Date of Patent: Jul. 17, 2018

(54) SELECTIVE CAPTURE WITH RAPID SHARING OF USER COMPUTER OR MIXED REALITY ACTIONS, STATES USING INTERACTIVE VIRTUAL STREAMING

(71) Applicant: Louis Gurtowski, Wyomissing, PA (US)

(72) Inventor: Louis Gurtowski, Wyomissing, PA (US)

(*) Notice: Subject to any disclaimer, the term of this patent is extended or adjusted under 35 U.S.C. 154(b) by 175 days.

(21) Appl. No.: 14/525,053

(22) Filed: Oct. 27, 2014

(65) Prior Publication Data

US 2015/0120883 A1     Apr. 30, 2015

Related U.S. Application Data

(60) Provisional application No. 61/961,875, filed on Oct. 25, 2013.

(51) Int. Cl.
G06F 15/16 (2006.01)
H04L 29/06 (2006.01)
(Continued)

(52) U.S. Cl.
CPC .......... *H04L 65/60* (2013.01); *H04L 65/4015* (2013.01); *H04N 21/2402* (2013.01);
(Continued)

(58) Field of Classification Search
CPC . H04L 65/60; H04L 65/4015; H04N 21/4307; H04N 21/632; H04N 21/266; H04N 21/2402; H04N 21/00
See application file for complete search history.

(56) References Cited

U.S. PATENT DOCUMENTS

| | | | |
|---|---|---|---|
| 5,886,275 A | * | 3/1999 | Kato ............... G10H 1/365 434/307 A |
| 6,415,317 B1 | | 7/2002 | Yelon et al. |

(Continued)

FOREIGN PATENT DOCUMENTS

WO    2013085639 A1    6/2013

OTHER PUBLICATIONS

International Search Report dated Feb. 20, 2015 issued in connection with corresponding International Application No. PCT/US14/62467 (2 pages total).

(Continued)

*Primary Examiner* — Michael A Keller
(74) *Attorney, Agent, or Firm* — Stuart H. Mayer; Mayer & Williams PC

(57) ABSTRACT

A method for streaming interactive media between clients includes streaming a first series of packets from a server to a first client. The packets include data, instructions and timestamps for executing the instructions. At least one of the instructions requests capture of client-based events. A second series of packets is received from the first client device. The second series of packets includes one or more captured client-based events generated in response to the instructions requesting capture of one or more client-based events. The second series of packets further includes one or more timestamps associated with each of the client-based events. The first series of packets is merged with the second series of packets based on the time-stamps included with the first and second series of packets to form a merged series of packets. The merged series of packets are streamed to a second client device.

21 Claims, 12 Drawing Sheets

(51) Int. Cl.
*H04N 21/24* (2011.01)
*H04N 21/266* (2011.01)
*H04N 21/43* (2011.01)
*H04N 21/63* (2011.01)

(52) U.S. Cl.
CPC ....... *H04N 21/266* (2013.01); *H04N 21/4307* (2013.01); *H04N 21/632* (2013.01)

(56) References Cited

U.S. PATENT DOCUMENTS

| | | | |
|---|---|---|---|
| 6,628,287 B1 * | 9/2003 | Duda | A63F 13/12 |
| | | | 345/474 |
| 6,708,337 B2 | 3/2004 | Moysan et al. | |
| 7,244,181 B2 | 7/2007 | Wang et al. | |
| 7,457,878 B1 | 11/2008 | Mathiske et al. | |
| 7,458,013 B2 * | 11/2008 | Fruchter | G06F 17/30259 |
| | | | 707/E17.024 |
| 7,853,615 B2 | 12/2010 | Liu et al. | |
| 7,925,485 B2 | 4/2011 | D'Amora et al. | |
| 8,400,548 B2 | 3/2013 | Bilbrey et al. | |
| 8,495,675 B1 | 7/2013 | Philpott et al. | |
| 8,752,006 B1 * | 6/2014 | Tolle | G06F 8/30 |
| | | | 717/106 |
| 2002/0114330 A1 | 8/2002 | Cheung et al. | |
| 2004/0045017 A1 * | 3/2004 | Dorner | G06F 9/547 |
| | | | 719/330 |
| 2005/0114022 A1 * | 5/2005 | Podshivalov | G01S 19/258 |
| | | | 701/468 |
| 2007/0266170 A1 | 11/2007 | Mockett | |
| 2008/0172488 A1 | 7/2008 | Jawabar et al. | |
| 2009/0249222 A1 * | 10/2009 | Schmidt | H04N 21/2368 |
| | | | 715/751 |
| 2010/0058207 A1 | 3/2010 | Hamey et al. | |
| 2010/0070878 A1 * | 3/2010 | Amento | G11B 27/34 |
| | | | 715/751 |
| 2010/0325258 A1 | 12/2010 | Carpenter et al. | |
| 2011/0007078 A1 | 1/2011 | Cao et al. | |
| 2011/0119392 A1 | 5/2011 | Shamilian et al. | |
| 2011/0122769 A1 * | 5/2011 | Zhang | H04B 3/54 |
| | | | 370/235 |
| 2013/0100830 A1 * | 4/2013 | Brady | H04L 43/10 |
| | | | 370/252 |
| 2014/0082146 A1 * | 3/2014 | Bao | H04L 65/605 |
| | | | 709/219 |
| 2014/0173467 A1 * | 6/2014 | Clavel | H04L 12/1822 |
| | | | 715/758 |
| 2014/0280186 A1 * | 9/2014 | Peters | G06F 17/30613 |
| | | | 707/741 |
| 2014/0280737 A1 * | 9/2014 | Bicket | H04L 67/02 |
| | | | 709/218 |

OTHER PUBLICATIONS

Written Opinion dated Feb. 20, 2015 issued in connection with corresponding International Application No. PCT/US14/62467 (6 pages total).

Kipfer, P., and R. Westermann. 2005. Improved GPU Sorting. In GPU Gems 2: Programming Techniques for High-Performance Graphics and General-Purpose Computation, ed. by M. Pharr. Boston: Addison-Wesley Professional. Retrieved from: http://http.developer.nvidia.com/GPUGems2/gpugems2_frontmatter.html.

Jiang, X, et al., "Latency and Scalability: a Survey of Issues and Techniques for Supporting Networked Games", Smart Internet CRC, Telecommunications and Information Technology Research Institute, University of Wollongong, Australia, Conference: Networks, 2005. Jointly held with the 2005 IEEE 7th Malaysia International Conference on Communication., 2005 13th IEEE International Conference on, vol. 1 pp. 150-155 (6 pages total).

Cheshire, S. "Latency and the Quest for Interactivity", Paper commissioned by Volpe Welty Asset Management, L.L.C., Nov. 1996, Retrieved from: http://www.stuartcheshire.org/papers/latencyquest.html Retrieved on: Oct. 24, 2014 (10 pages total).

Allison, R.S., et al. "Effects of Network Delay on a Collaborative Motor Task with Telehaptic and Televisual Feedback", Paper commissioned by the Association for Computing Machinery, Inc., pp. 375-381, 2004, (7 pages total).

Ting-Hao Huang, "3D Scene Streaming over P2P Network," Master's thesis, National Taiwan University, Taiwan, Jan. 2007 (50 pages total).

Nathan Elmore: Classifying Emotion Using Streaming of Physiological Correlates of Emotion "Master Thesis in Computer Science University of Montana" Dec. 2012 (47 pages total).

Ana Paula Couto da Silva, et al., "Exploiting Heterogeneity in P2P Video Streaming" 2010 IEEE Transactions on Computers. (13 pages total).

Abeni, L, et al. "Design and Implementation of a Generic Library for P2P Streaming" Paper presented at the international conference of ACM Multimedia 2010, Florence, Italy. (5 pages total).

Gao W, et al., "Recent Advances in Peer-to-Peer Media Streaming", China Communications, Oct. 2006: pp. 52-57 (6 pages total).

\* cited by examiner

Examples of SVSR Topologies of Producers

SVSR Internal Architecture Using HTTP/Websockets

United States Patent US 10,027,731 B2

SELECTIVE CAPTURE WITH RAPID SHARING OF USER COMPUTER OR MIXED REALITY ACTIONS, STATES USING INTERACTIVE VIRTUAL STREAMING

STATEMENT OF RELATED APPLICATION

This application claims the benefit of U.S. Provisional Patent Application Ser. No. 61/961,875, filed Oct. 25, 2013, entitled "Selective Capture with Rapid Sharing of User Computer or Mixed Reality Actions, States and Experience Using Interactive Virtual Streaming", the disclosure of which is incorporated by reference with the same effect as if set forth at length herein.

BACKGROUND

Internet based video streaming has becoming much more practical since the advent of broadband networks capable of supporting the high bandwidths required for the transmission of video signals. Typically, a video server or video distribution server streams a given video—which may consist of a prerecorded video program (e.g., a movie) stored on the video server, or either a real-time (i.e., live) video program or a prerecorded video program provided to and then distributed by the video server—to a plurality of clients. This is the case, for example, in Internet video broadcasting applications such as, for example, IPTV (Internet Protocol Television). However, when a plurality of clients wish to simultaneously view a video program and to also collaborate in some endeavor related to the video program, only a separate parallel and independent interactive communication process between the clients is available for collaboration purposes. For example, the clients who wish to collaborate in an endeavor related to the video program may use a teleconference to verbally discuss the video being streamed, or may use an Internet chat to send text messages about the video to each other. In any case, they are generally unable to control the streaming of the video program about which they are collaborating.

Non-video collaborative environments for example 3D based have a different set of issues. Currently, when user collaboration is desired, the server maintains the state of the virtual world to ensure consistency for all users, thereby creating problems with low-latency applications. This occurs because a computer in this environment often cannot process a command and display the results until it has validated with the server, creating latency delays, especially over a wide-area network (WAN).

Much research has been done on this issue over the last ten years. A number of solutions have been put forward, some of which involve computing results on both client and server and correcting later if needed. These solutions may be satisfactory in some applications such as network games, but because they require specific programming they may be problematical when spontaneous user collaboration is desired. This is a long term issue since progress in latency reduction trails bandwidth and CPU improvements, as the former is tied to physical limits including the speed of light.

SUMMARY

The methods, systems and devices described herein address the problems and limitations discussed above by using bi-directional streaming to provide a user with an interactive virtual experience, to capture selected parts of that user's interactive experience, which may include not only user actions but possibly also a variety of sensor data and other data. The captured user experience integrated with the original interactive virtual experience may then be streamed to other users. In essence, sharing a user's actions, states, and experience with others in quick and efficient manner.

The states and experience of the user can be derived at least in part from the multiplicity of sensor devices with which modern computing devices (e.g., PCs as well as mobile devices such as smartphones and tablets) are equipped. These states can range from characteristics of the computing device to information about the user and the surrounding external world. Experience can be derived from user physiological states or from direct feedback by the user.

In some implementations the methods, systems and devices described herein are optimized for average users using a mobile device to communicate over the Internet. The term "Interactive Virtual Streaming" as used herein indicates that the streaming content contains non-video elements, permitting significant interactivity. These elements could be 3D or 2D or a combination of both. Other forms of rich media such as videos and photographs could also be present. In addition to video and audio, in some cases other sensory data such as touch (haptic devices), smell and the like may be supported. Moreover, augmented reality and augmented virtuality applications may also be supported.

In general, the methods, systems and devices described herein are quite flexible and may support a wide range of application from the simple (e.g., capturing a user pressing the keys of a virtual piano) to the more complex (e.g., medical testing of a user's reaction to different stimuli). Another class of sophisticated applications that is supported is collaborative virtual projects involving multiple users operating in a collaborative virtual environment (CVE).

When operating in a collaborative virtual environment or a mixed reality environment, the methods, systems and devices described herein provide a cost-effective architecture and associated algorithms that provide support for user-collaboration, entertainment and industrial applications regarding activities involving a limited group of active users, providing the users with the option of streaming the results as they are occurring to a much larger group of passive users. Thus, spontaneous collaboration methods and selective real time recording of human interface devices (H.I.D) and sensor inputs are supported, as are low-latency applications.

In accordance with one particular aspect of the subject matter disclosed herein, a method is provided for streaming interactive media between clients. In accordance with the method, a first series of packets is streamed from a server to a first client. The packets include data, instructions and timestamps for executing the instructions. At least one of the instructions in at least one of the packets requests capture of one or more client-based events that are to be communicated back to the server. A second series of packets is received from the first client device. The second series of packets includes one or more captured client-based events generated in response to the instructions requesting capture of one or more client-based events. The second series of packets further includes one or more timestamps associated with each of the client-based events. The first series of packets is merged with the second series of packets based on the time-stamps included with the first and second series of packets to form a merged series of packets. The merged series of packets are streamed to a second client device.

In accordance with another aspect of the of the subject matter disclosed herein, the method further includes: receiving from the first client device a third series of packets that include one or more captured client-based events that are asynchronously generated and not generated in response to the instructions requesting capture of one or more client-based events, the client-based packets further including one or more timestamps associated with the each of the client-based events; and merging the first, second and third series of packets based on the time-stamps included with the first, second and third series of packets and the client-based packets to form the merged series of packets.

In accordance with yet another aspect of the of the subject matter disclosed herein, a method is provided for generating an interactive media stream. The method includes: receiving from a server streaming content that includes data, one or more instructions and timestamps for executing the instructions, at least one of the instructions requesting capture of one or more client-based events that are to be communicated back to the server; and transmitting to the server additional streaming content that includes one or more captured client-based events generated in response to the instructions requesting capture of one or more client-based events, the additional streaming content including one or more timestamps associated with the each of the client-based events.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

As explained in detail below, methods, techniques and systems are provided which allow a simple or complex set of user responses and sensor data to be captured and integrated into interactive streaming files with high accuracy and at high speed. Moreover, input data (e.g., objects) may be spontaneously added in such a way that the resulting combined mixed file(s) can be displayed quickly to others, communicating with precision the user's experiences, actions and intents. Furthermore a design architecture is provided that can permit a great deal of flexibility in a multi-user system with minimum server constraints on how final streams are created and selected, including how decisions are made between and among users.

Operating Environment

Figure 1:
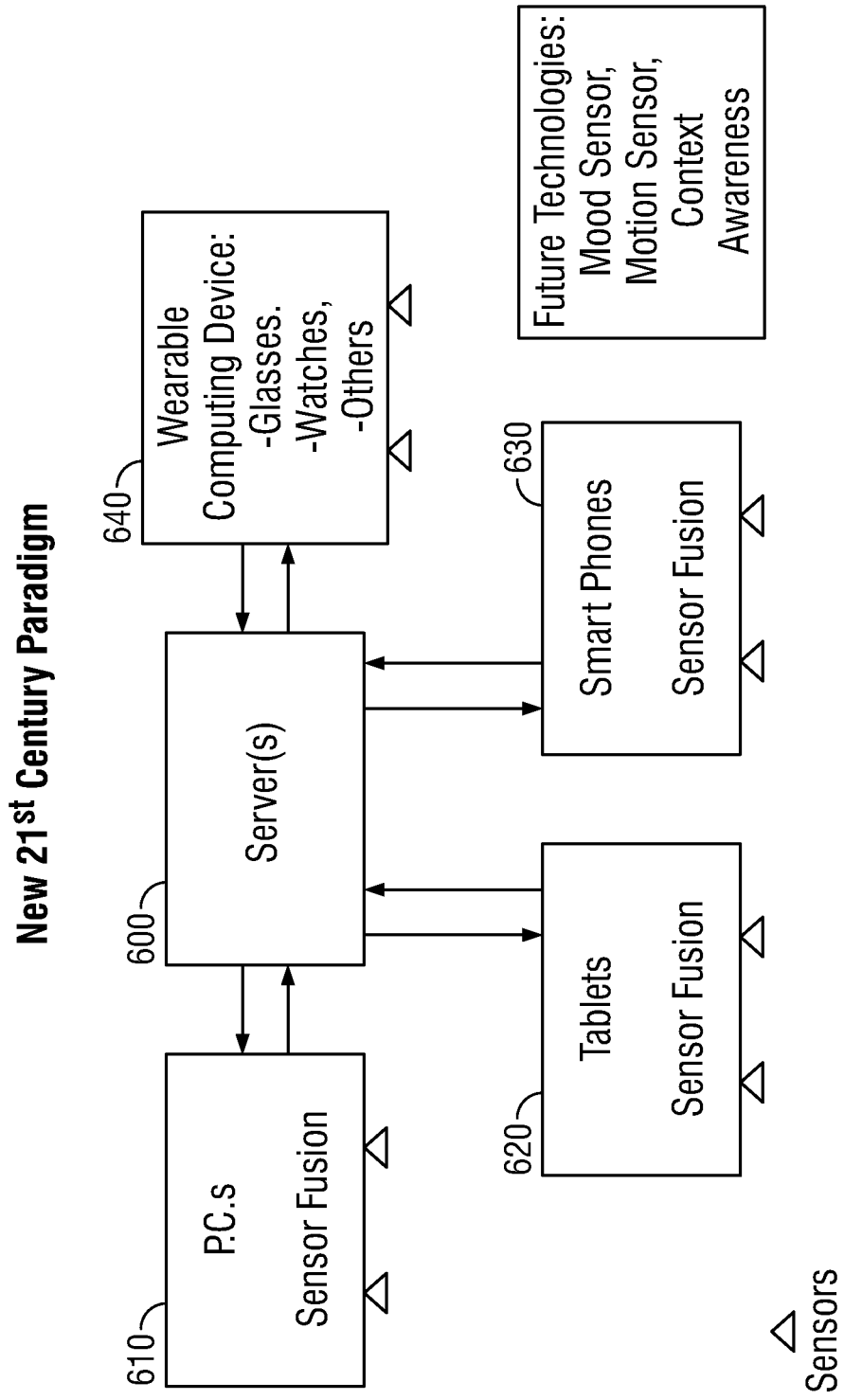
FIG. 1 shows one example of an operating environment in which the methods, systems and devices shown herein may be employed.

The methods, techniques and systems described herein may be implemented, in one implementation, using a client-server architecture such as shown in FIG. 1, which shows a server 600 communicating over one or more networks (not shown) with a variety of illustrative client devices such as PC's 610, tablets 620, smartphones 630 and wearable computing devices 640. As FIG. 1 demonstrates, servers are servicing an increasing number of heterogeneous computing platforms, with an increasing number of these platforms being mobile. Further, many of these mobile platforms are equipped not only with cameras but with a large number of other sensors to provide information on the real environment they are operating in such as location, biometric, environmental, motion, orientation and so on. Videos and photos of the real or augmented reality could also be part of the environment.

Such mobile platforms are likely to become even more powerful in the future. For example, smartphones may be equipped with arrays of sensors and other devices to measure various physiological states of its owners such as monitoring health, excitement level and even mood and emotions. Wearable computers may also become quite common. It should be noted that multiple computers system can be operated by one person, for example Google Glass or other wearable products may be used along with a smart phone. It is clear that transferring this person's computer experience to others may become more useful and interesting, while also presenting additional technically challenging problems.

The communication network(s) over which the server and clients communicate can be any type of network, including a local area network ("LAN"), such as an intranet, and a wide area network ("WAN"), such as the Internet including the World Wide Web (WWW). Further, the communication network can be a public network, a private network, or a combination thereof. The communication network also can be implemented using any type or types of physical media, including wired communication paths and wireless communication paths associated with multiple service providers. Additionally, the communication network can be configured to support the transmission of messages formatted using a variety of protocols Overview Because of the growth of various computing devices as described above and also because of the growing importance of social media, information flows are changing from being primarily download focused (e.g., from servers to clients), to a more balanced equilibrium between information in which information is both downloaded and uploaded (e.g., from clients to servers). Clearly, being able to offer generic and flexible solutions to communicate more effectively user(s) computer or mixed reality actions, states and experience through uploads to the server and then streaming in near real time it to other users could have many uses, especially for entertainment, education, and scientific and industrial applications.

As previously mentioned, a number of issues have limited the ability to stream information between servers and clients in the manner described above, especially for use by consumers in the mass market. For instance, until recently CPU limitations and bandwidth limitations have made this difficult or impossible to do on a reasonable cost basis for the average user. Only recently have new World Wide Web standards such as HTML5, WebSockets, and Web workers provided the hardware and software foundation support needed for such a task. For example until the recent introduction of WebSockets, bidirectional streaming was poorly supported on the Web, requiring one to use HTTP in non standard ways, resulting in many compatibility and performance issues. In addition, the development of adaptive streaming technologies further advance the ability to stream interactive media. Although adaptive streaming has primarily been used to download video on the Web, it also points the way on how to deal with the variability of bandwidth and other networking conditions on the Web.

The methods, techniques and systems described herein address a number of remaining problems. First is how to support the mass market with its many limitations in terms of products, cost and the average user's knowledge and behavior, which often involves intense multi-tasking at tasks such as reading email or text, playing games and so on. This problem will be addressed by distinguishing between active users and passive users, which will be discussed below. The second problem that is addressed concerns the ability to merge the downloaded stream(s) with user capture data and/or sensor data quickly and efficiently, so to be able to stream the merged stream to other users in near real time. This is a very challenging problem that requires a well thought out architecture. Third, adaptive streaming methods are generalized so that they can be applied to rich media types beyond video and are applied to manage upload issues for the capture of data. Finally, the amount and types of data on the client side is increasing dramatically, driven heavily by the number of sensors, 3D and augmented reality environments. If recording options could be changed or adjusted in something close to real time by users actually viewing the integrated streams, the technology would be much more optimal.

A secondary but nevertheless important issue is the capture process is a "Live event," unlike the process of downloading stored streaming files. Therefore, the capture process has its own capture clock and cannot generate information at a faster or slower rate than its capture rate. This creates significant timing and other problems. Another secondary issue is that streaming has been mostly used to stream data from a server to individuals rather than vice versa, and, as discussed above, until recently this applied to most kinds of data. Unfortunately this has caused many Internet Service Providers (ISPs) to implement their internet infrastructure with asymmetric bandwidth allocation between uploads and downloads, with uploads having only a fraction of the bandwidth available for downloads.

Another issue is that the provision and use of a multiplicity of sensors increases power consumption and CPU usage when they are active. This is a particular problem for mobile devices. For instance, the battery of a cell phone equipped with GPS will be quickly drained if the GPS is continuously running.

The methods, techniques and systems described herein will be referred to from time-to-time as Sensitive Virtual Streaming and Recording (SVSR). SVSR supports interactive virtual streaming but also provides a number of new features. For instance, the original streaming file(s) can be modified in a seamless and optimal way so that it is both adapted to be streamed and presented on its target environment in an optimal manner. The methods, techniques and systems described herein are also able to record in some manner the state of the interactive elements that have been triggered while being streamed or played in that local computer environment. The term "in some manner" is used because the goal of the technology is often not targeted to an exact recording of the entire range of the user response.

The name Sensitive Virtual Streaming and Recording suggests that the virtual streaming files are sensitive to some subset/combination of interactive elements when being executed in a local computer environment. It should be noted that sensor data can also be recorded at the same time—if needed—as interactive elements are triggered. It should also be noted that because actions and states, and possibly experience, may be recorded, a feedback loop is established between the servers and clients, which can be used to optimize the streaming process and possibly even the streaming content, by, for example, using the most-up to date location or state of the user such as sitting, walking, etc.

In some implementation of SVSR there is a division between users who produce a sequence of enhanced/new data streams and users who simply view those enhanced streams. The former users will be referred to as Producers and the latter users will be referred to as Observers. Producers enhance or add to existing streams, whereas Observers simply observe the results, although they may be permitted to give feedback to Producers. In addition, in some implementations one or more Observers may dynamically modify what is being captured by a special interface to the servers. For example, in the case of an advanced entertainment application one of the Observers could modify cameras shots or angles similar to the operation of a TV control room. In a medical/testing application, a physician-Observer could focus on an area of interest. Thus Producers and Observers can interact in a creative way even though their roles are different.

Figure 2:
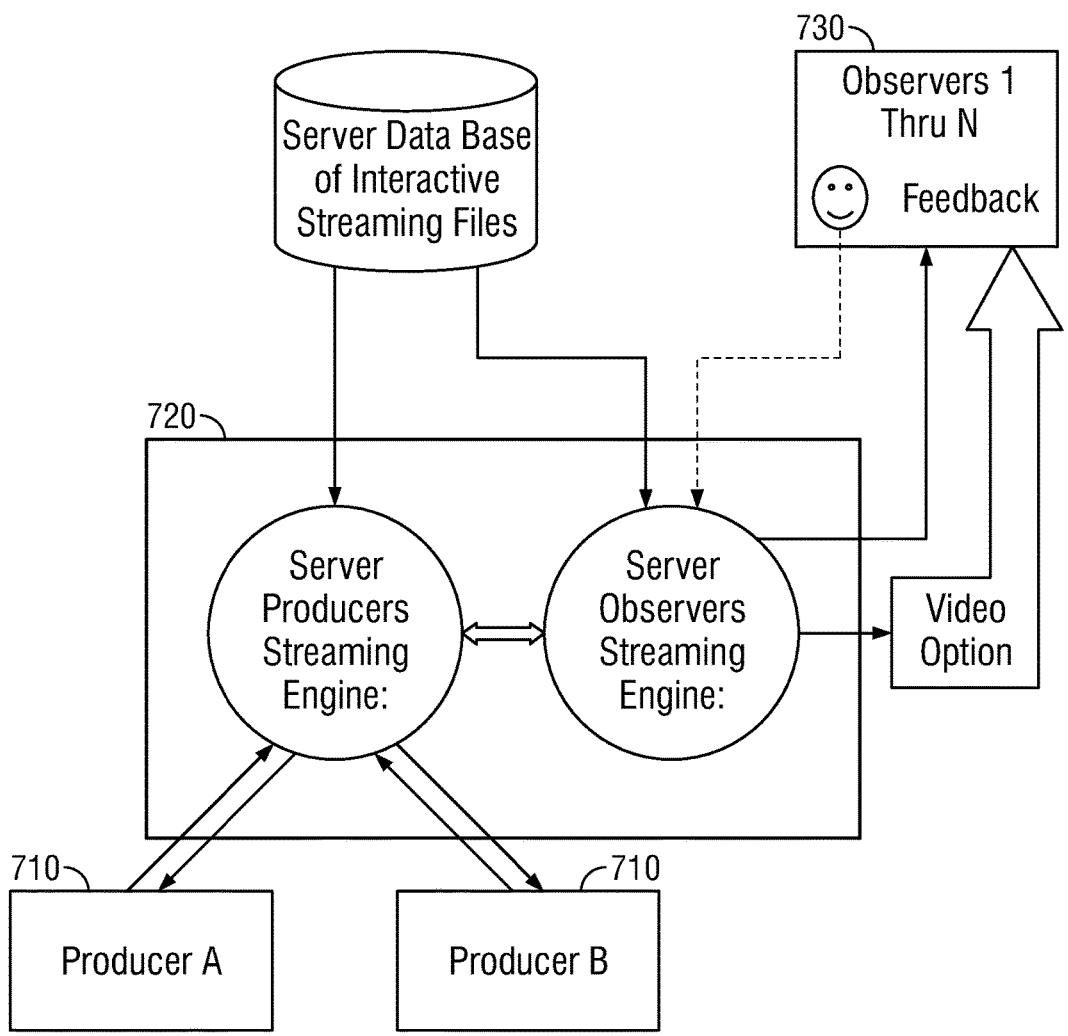
FIG. 2 illustrates a server interacting with both producers and observers.

FIG. 2 illustrates the concept of a server 720 interacting with both producers 710 and observers 730. The figure indicates from an implementation point of view that producers 710 will consume more system resources (CPU, bandwidth, etc. . . . ) and could have different timing and other requirements than observers. As also shown in FIG. 2, it may be useful to permit differences in the original streaming files between producers 710 and observers 730. As a simple example, a producer playing a virtual piano needs to see the piano keys in much more detail and with a different camera angle than observers. In fact, as will be explained below in more detail, this division between producers and observers can help make SVSR a powerful and practical technology.

Another aspect that is relevant to the division between producers and observers relates to the sharing of the states and experience of users. In the above terminology one would say that the states and experience of the producers is communicated to the observers. The states, and sometimes the experience, are derived from sensor data captured on the producer systems and may need to be simplified and summarized in order to be optimally communicated to observers. For instance, as a simple example, in the case of motion, instead of observers receiving a string of rapidly changing values a simple sentence such as "Producer walking north slowly" might be more effective.

User experience can be derived from user feedback directly or from user physiological data. The former is straightforward but the latter is of course much more complex. However algorithms have recently become available that can be used in real time to derive emotional moods from simple physiological sensors streaming data. It should be noted that using these methods, SVSR can visually correlate with a high degree of accuracy in time the user states and experience with user actions in a computer or mixed reality environment and, in addition, share this with others quickly and continuously using streaming.

From a practical perspective the restructuring of states and experience information for the Observers may be performed at the server level. If there are several producers cooperating in a scene, a decision will need to be made depending on the application, on the use of the sensor data and which observer or combination of observers to use to derive the states and experience from.

It should also be noted that SVSR is a flexible technology and its optimal implementation permit Observers to become Producers and vice versa in a simple way as will be explained below.

Figure 3A:
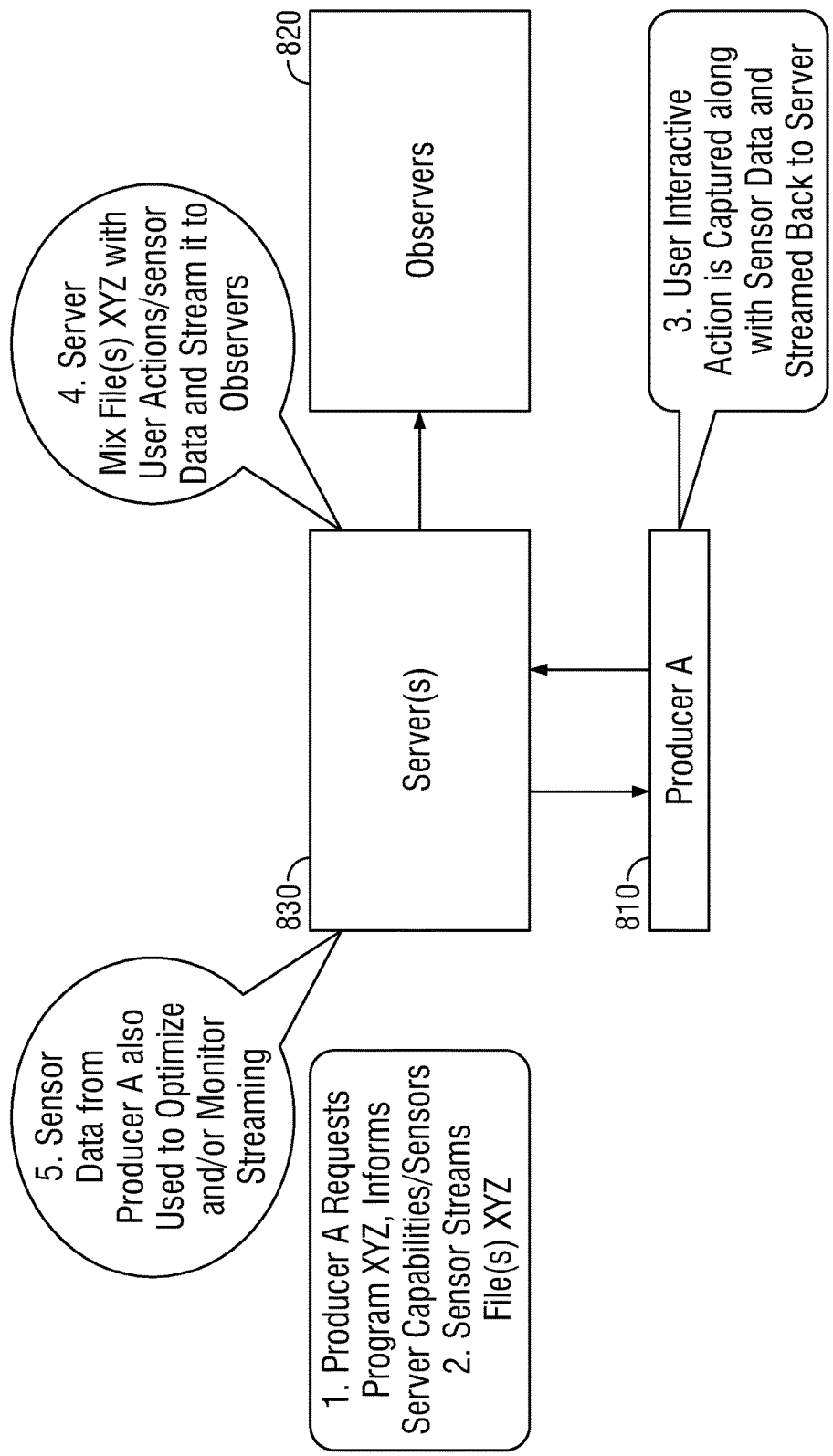
FIGS. 3a-3c are flow diagrams showing communication between a server, a producer and an observer.

Although a scenario in which there is only a single producer is the simplest, it may be used to demonstrate the methods of SVSR. FIG. 3a is a flow diagram showing communication between a server 830, producer 810 and observer 820. Step 1 shows the server streaming an interactive animation sequence to Producer A based on a request for Program XYZ. Step 2 shows alternate sequences of streaming from the server followed by recording of user's interactivity and sensor data. Step 3 shows the streaming of the user selected actions and sensor data back to the server. Step 4 shows the server creating an integrated final stream containing the original stream, modified with user actions and sensor data. The integration of the original stream (maintained on the server) and user actions are performed on the server, saving the limited upload bandwidth. The integrated stream can be optimized for network conditions as explained below to permit smooth streaming to observers. Sensor data can be used in two ways, one being displayed to observers and the second way, as illustrated in step 5, is to use sensor data to optimize and monitor the streaming of original files.

SVSR allows the sharing of the "Producer(s) computer virtual experience" by emphasizing precise timing and smoothness of the final integrated stream(s). SVSR permits long interactive streams to be streamed, alternating with recordings of user and sensors data, while being able to adapt to changing network and other conditions to maintain reasonable smooth streaming to others.

It should be noted that although audio and visual interactions are primarily discussed herein, SVSR applies to other senses such as touch and smell and other such as haptic devices.

Figure 3B:
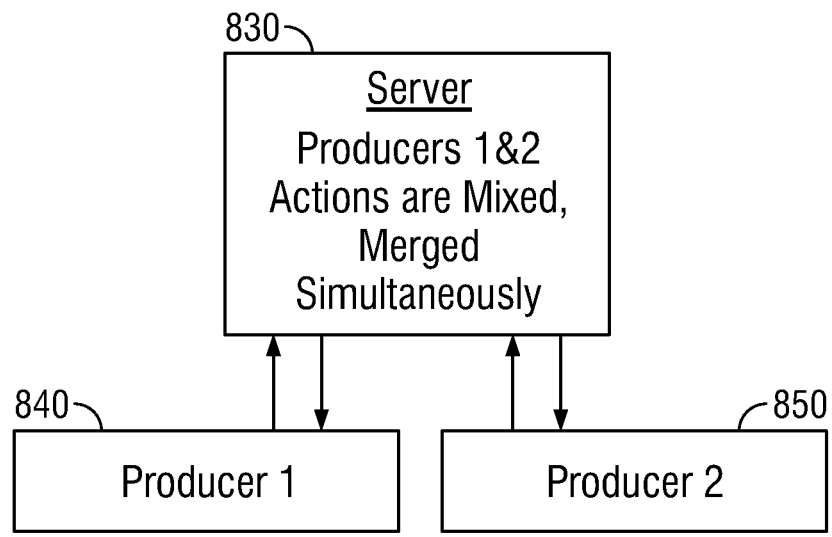
Figure 3C:
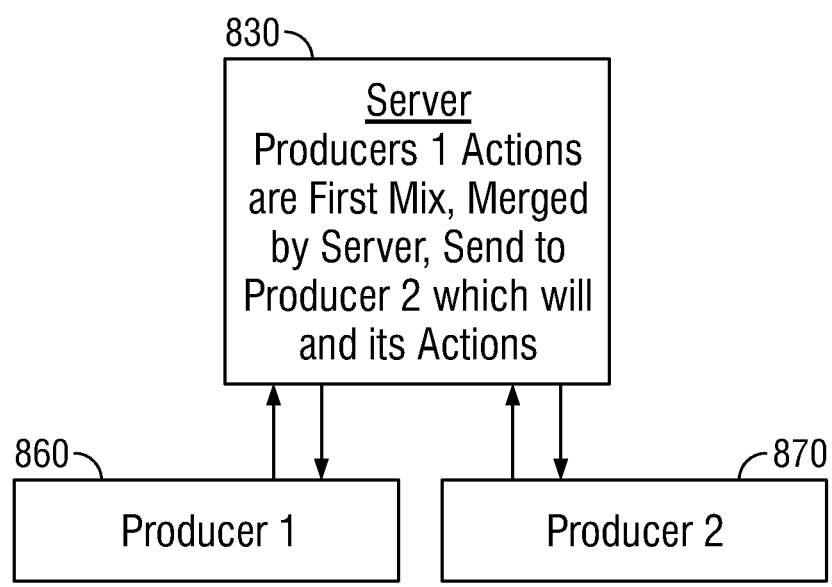

In those cases where there is more than one producer, streaming data can be enhanced by the producers in two distinct ways as illustrated by FIGS. 3b and 8c. In FIG. 3b, the actions of two producers 840 and 850 are mixed and merged simultaneously by server 830. In FIG. 3c the actions of two producers 860 and 870 are mixed and merged sequentially by server 830.

As previously mentioned, one significant capability of SVSR is its ability to merge streams together rapidly. To achieve this capability, SVSR may be built on a modular architecture for streams. Namely, in this implementation a SVSR stream includes a sequence of building blocks/packets in a specified format. The basic packets of SVSR streams are small, time stamps packets of data and instructions that can be combined into a larger stream. The blocks/packets can be quickly dissembled and recombined in different ways. User and Sensor capture information can be easily formatted and merged with the original stream on the server. The resulting stream can be transmitted to others.

Because of SVSR's modular architecture, adaptive streaming beyond video can be implemented. For instance, an SVSR stream for a 3D animation character may be created for different bandwidths and specified for smart phone or a tablet or other hardware. The Mixer has precisely the ability to create such combinations. A manifest file in the server can contain information needed for the client player software to obtain the needed information and then request from the Mixer the appropriate combination of stream/packets. Once created the file can be downloaded to the client.

Figure 4:
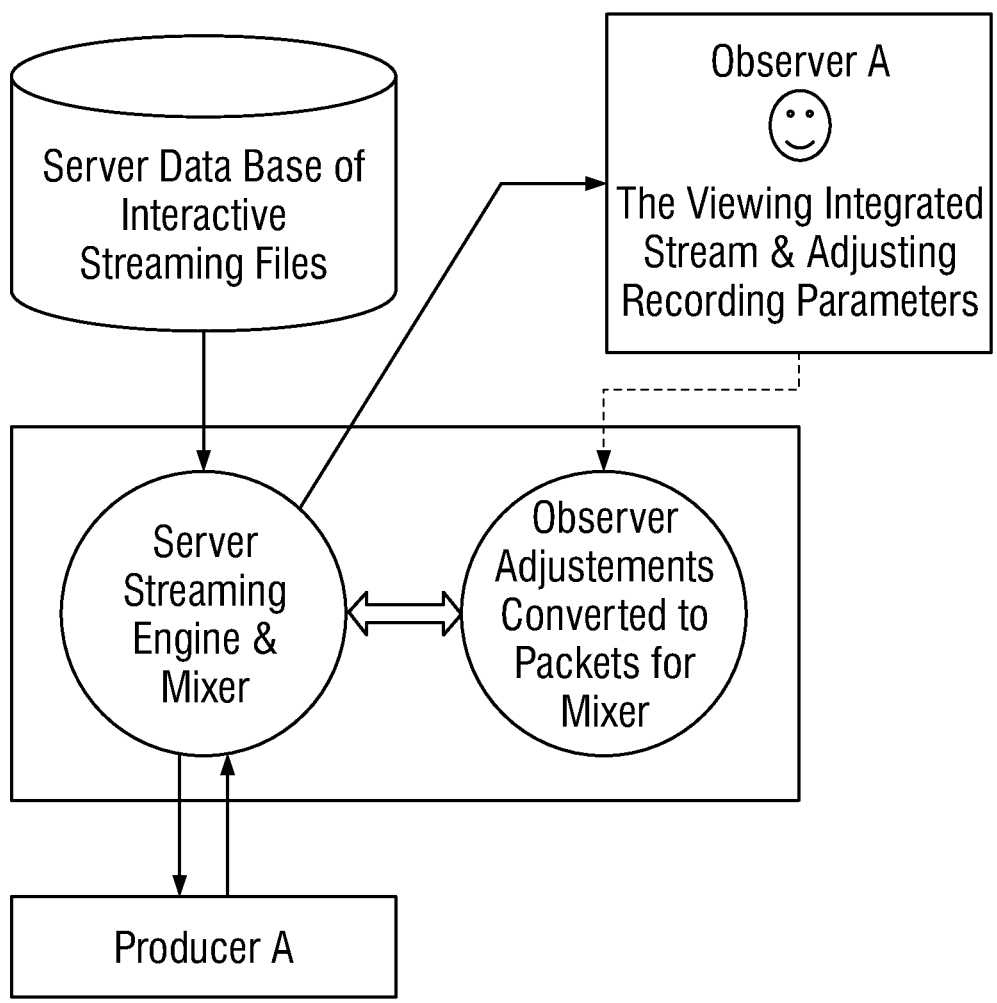
FIG. 4 shows an interactive streaming arrangement in which a producer's actions are captured and sent to a server.

However beyond the conventional approaches to adaptive streaming, SVRS can open up a new approach to bi-directional streaming, namely, the ability to adjust the elements that are captured and streamed in near real time by inserting directly into the stream instructions for modifications of the streaming and capture elements. This could be done by user(s) directly through a small interactive application. FIG. 4 shows an example in which Producer 302 (Producer "A") is using an interactive SVSR streaming program and capture of some of Producer A's actions has taken place. The capture of the packets has been sent to the server 304 where the mixer 306 has integrated them with the original packets. In addition, the resulting integrated stream has been sent to Observer A. Observer 308 (Observer "A"), looking at the results, has decided to make some recording parameter changes. These changes are then integrated into one or more packets. The mixer 306 adds these packets to the stream being downloaded to User A where they will be activated.

A producer's capture event is a "Live event." Unlike downloading stored streaming files, the producer's capture event has its own capture clock and cannot generate faster or slower than its capture rate. Thus a delay may be needed to properly buffer the output so as to maintain smooth streaming. A delay on the order of 5 to 30 seconds, for example, depending on the conditions between producers and observers, can handle the buffering while still keeping the "Live nature of events".

Another issue to be addressed concerns the possibility of a sudden decrease in bandwidth while maintaining robustness. A delay can also be used for optimization under these circumstances; one way is to better compress the stream before sending it to observers, which may also be important for quality purposes. It should be noted, however, that communication latency between multiple producers generally should be kept to a minimum since it could impact the collaborative effort.

In terms of implementation, SVSR may be treated as a framework consisting of architecture and a series of methods and algorithms that permits both the creation and the adaptive playback of virtual streaming file(s) and the capture on the fly of specified local time responses to interactive elements within the above file(s). Sensitivity configuration parameters define what subset/combination of interactive elements the streaming file(s) are sensitive to and in what manner the original files can be modified. These sensitivity configuration parameters can be dynamically changed and, some cases, can be inserted almost anywhere in the streams.

In the case of Augmented Reality applications, SVSR can also play a role, although in a different way. In this case SVSR streams can be used to supplement/overlay real world videos. U.S. Pat. No. 8,400,548 describes an overall method to create and synchronize motion sensors on mobile devices an information layer that is overlaid on top of live video. This information layer is generated by the server using object and pattern recognition methods and possibly also containing notes or other information from the user. This method may be used with streaming to regularly update the information layer as more objects are recognized or to correct possible errors that may arise, for example, from partial views or poor lighting. SVSR can accomplish this since it flexibly stream data using SVSR packet instructions while simultaneously capturing user(s) corrections or annotations.

Interactive elements are usually referred to in the literature as objects and the triggering of these objects is usually referred to as a change of state of the objects. To optimally support spontaneous user collaboration, a technology should not only be able to capture and quickly transmit a change of state of objects to other users, but also let users make significant changes in current objects under specified conditions and even, if meaningful for the application, introduce new objects with their own methods and properties.

Capture packets (or "cPackets") are SVSR compatible packets that have the local time responses information added to triggered interactive elements or sensor data, or stated in more technical terms, the change of states of objects from the local computing session. The cPackets have structures similar and compatible with the original virtual stream file(s) and thus can be integrated quickly with the original streaming file. In some implementations the player tool used to display the stream also contains a recording feature and thus can generate cPackets. Thus users can create in a transparent and seamless manner cPackets when they use the player/recorder tool.

Semantic packets (or "sPackets") are packets of data containing new object(s) or major modifications of existing objects that are not produced by the player/recorder tool They permit users to import new objects into the virtual stream or modify existing objects by changing their characteristics and not just their states, for example, by adding new textures for an existing 3D or 2D object. The word semantic is used to indicate that these packets have their own meaning outside the virtual streams. Unlike cPackets, sPackets are not created by the player/recorder but are often created off line by an editing tool.

A module generally hosted on the server, referred to herein as a mixer, can integrate at high speed the cPackets and sPackets generated by a user with the original streaming file(s), permitting other users to experience the first user's actions and states. These users, in turn, can make their own modifications to the streaming files.

In comparison to conventional capture methods, SVSR provides the speed necessary for effective user collaboration. Conventional methods are generally ineffective or quite expensive when latency and other delays are important considerations. Furthermore, because technological progress in latency is typically slower than progress in bandwidth and CPU/GPU performance, SVSR may remain an effective user collaboration technique for the foreseeable future.

SVSR is particularly advantageous for use in markets and applications that can tolerate small delays between user views and multi user interactions in the collaborative virtual environment (CVE), but which require low latency, accurate time capture of each user action and sensor data, and support for spontaneous actions. In this way, SVSR can give each producer, when his/her turn comes, complete control—if needed—of the CVE for a short length of time, which is usually a function of the application and/or the user's decisions. It should be noted that the CVE could consists of a single object or multiple objects. Of course, applications where each producer interacts with a separate part of the virtual environment will also work with SVSR. An example of this would be a virtual music room where each producer would play a separate instrument.

Unlike the rigid approach seen in network games that work within a similar paradigm—for example, network chess games—SVSR offers a fast, flexible, and powerful framework that communicates by streaming the experiences and/or actions of a user to other users, including unstructured and spontaneous responses.

SVSR technology may be implemented in a variety of different ways. In one particular embodiment, SVSR includes three primary aspects.

The first aspect includes a streaming file architecture to support the streaming of multimedia data (including but not limited to 3D, 2D, and audio) that can function on limited bandwidth (e.g., 256 Kbits) but that can also be at higher bandwidths up to and including, in some cases, 100 Mbps or more. The specifications and design of the streaming media files should be flexible and modular enough to permit on-the-fly merging of additional data. These additional data would typically include producers' responses, but they could also originate from non-human feedback devices or augmented reality inputs.

The architecture chosen for this particular implementation relies heavily on the use of time stamps throughout the entire streaming file. The rational for this is that both the original playback data and the user responses can be highly time-dependent, and therefore need to be positioned in the file in such a way as to permit efficient streaming and to accurately reflect the user time responses. This requires the use of a common central time clock for both the playback and capture of the user responses.

In terms of tools, an encoder tool is generally used to create the virtual streaming file, and a tool usually known as a "player" is needed to play back the encoded data. In one embodiment, the player tool and the capture software will be merged together, thus making the synchronization to a common clock a non-issue. An encoder tool is needed to take 3D and/or 2D, audio format, sound, and animation sequences, for instance, and organize them in an optimal way for the given bandwidth. In addition, for SVSR, it is advisable to specify a certain amount of bandwidth for producer's responses in the headers of the stream file.

The second aspect of this particular implementation includes algorithms, methods, and tools that can record user inputs, responses, and potentially other forms of external responses. Much of the recorded data may need to be filtered and reformatted to create optimized response stream(s) in the form of building blocks compatible with the architecture described above and, it should preferably be performed on the fly. Data that can be captured are referred to as "hot objects" in the media file, namely objects that will react in some way when touched, moved, and so on. It should be noted that SIR can permit the capture of complex user responses, for example, the responses of a novice performing in time when assembling a 3D model of a complex piece of machinery or a subtle musical work or painting created in a virtual world by an accomplished artist. Furthermore, another useful aspect of this implementation is that the level of details of the user response (e.g., sampling rate and others data) that is captured can be easily specified easily and modified before the capture session. This could be especially useful, for example, in training. Of course, the specified user responses that need to be captured will depend on the nature of the application and the bandwidth available. New and spontaneous data can also be added to the original stream file using sPackets. Because of the volatility of communication on the Internet. SVSR also offers a number of validation methods during and after capture. They are based on the timestamp information which is a key feature of SVSR architecture.

The third aspect of this particular implementation of SVSR includes the methods that enable user collaboration in a practical sense. In particular, methods and algorithms are provided that permit bidirectional or multidirectional user exchanges at speeds fast enough for reasonable human collaboration. This aspect involves a method of merging at high speeds the original stream and users inputs, including determining where and when this is to be done.

Illustrative Architecture and Format of the Streaming Packets

In one implementation the architecture and format of the streaming packets are based on the use of Time Stamped Remote Procedure Calls, implemented as a sequence of compressed packets. The following is a simplified description of the compressed packets streams that can be generated using the encoder on various multimedia data. Additional details concerning Time Stamped Remote Procedure Calls may be found in U.S. Pat. No. 6,708,337, which is hereby incorporated by reference in its entirety.

As discussed in aforementioned patent, the format for the packet may be as follows:

Txxx, Pxxx, N, S1, S2, . . . Sn, P1, P2, . . . , Pn where:

Txxx is a time stamp specifying when to start the procedure call;

Pxxx is the procedure number to call according to a predefined protocol between server and client. These procedures can be internal data and object management procedures. They also can be generic audio, 2D, 3D, and other calls that will in turn be translated into local user routines. For the latter case it is suggested to define a Common Interface API library for the procedures including graphics, audio and others for all client devices. A module in the player will then translate these into local routines. For example, 3D Common Interface calls will be translated typically into either DirectX or WEBGL or OpenGL ES.

N is the number of parameters;

S1, S2, . . . , Sn are the sizes of parameters; and

P1, P2, . . . , Pn are the parameters of the procedure.

Parameters can be large data buffers, for example a texture or mesh for 3D.

However to support cPackets and sPackets that are used for SVSR user collaboration as described herein, an extended format of the above packets of the following format may be supported:

Txxx, Lxxx, Pxxx, N, S1, S2, . . . Sn, P1, P2, . . . , Pn where:

Lxxx is a stamp indicator specifying the origin, namely, the user identification and session identification where the cPackets or sPackets originated from. A small number of LXXX, say 0 through 100, can be reserved to indicate original server streams. The session IDs are important since a single user could interact with a stream at several different times. Lxxx also has flags indicating a cPacket's or sPacket's origination source and reserved bits for P2P possible support.

Txxx is a time stamp specifying when to start the procedure call;

Pxxx In addition to the procedures mentioned previously, Pxxx can also be RequestCapture Procedures, which are procedures that enable CallBack of functions to perform the recording of specific user events. There are a number of RequestCapture Procedure types, including for setting up the Capture, enabling the Capture and modifying or removing the Capture event.

The parameters on these procedures identify the objects of interest and the conditions needed for recording and the exact data to be captured N is the number of parameters;

S1, S2, . . . , Sn are the sizes of parameters; and

P1, P2, . . . , Pn are the parameters of the procedure.

The following shows typical examples of often used RequestCaptureProcedures:

Mouse enters Object

Mouse leaves Object

Mouse click Object

Mouse down on Object

Objects are typically identified by an Id which will be one the parameters of the RequestCaptureProcedures.

RequestCaptureProcedures for simple Mouse movements can also be supported and typically have the form Mouse Move Position, deltaX, deltaY However they should be used sparingly in the stream due to their potential large numbers. Examples of touch interface are:

Touchstart Object

Touchseend Object

Touchmove Object

Other forms of user actions such as support tactile screens, mobile phone or tablet orientation, keyboards, haptic devices and many others, including multimodal support, can be fully supported by this technology.

Setup and enabling capture should be separate procedures to maximize timing measurement accuracy. Options to shut down, pause or restart the recording or modify the recording parameters may also be defined.

The above procedures are of course very application specific. In the above case the Lxxx has an undefined value since these instructions will be part of an original server stream. That is, the trigger for recording and/or changing recording parameter settings and associated functionalities can be conducted or changed dynamically because they are an integral part of the streaming data.

Synchronization packets instructions are a kind of NoOp or dummy instructions that are simply used to properly synchronize the server and the producers and will be discussed later in this document.

In addition to the above, packets can support procedures to support sensor recording. Again they may have the form:

Txxx, Lxxx, Pxxx, N, S1, S2, . . . Sn, P1, P2, . . . , Pn where the Pxxx are sensor procedures such as initialize sensor S1, trigger sensor recording on sensor S1 and so on. The parameters specify the recording conditions such as all values or values below or above a certain amount and sampling rates. Sensor inquiry instructions using industry standard names may also be used so that the server can identify the sensor capabilities of producers at the start of the streaming process.

A number of the advantages of the methods, techniques and systems described herein arise from the flexibility of these packets, which is made possible because the set of instructions streamed to the client can be changed quickly and dynamically by the server. This ability can be very useful, for example, when network conditions change suddenly. Another benefit of this approach is it reduces the need for the client to host large programs since part of the programming is streamed to the client when it is needed. This approach can reduce the power consumption and CPU power needed by the client, which is a very practical concern.

Encoder

The encoder used to generate the streams may support 3D encoding or 2D encoding or both depending on the application. For 3D the encoder may accept a sequence of animated multimedia data typically seen in 3D design tools such as 3DS Max or Maya, or in the COLLADA file format, which is an industry standard exchange format for 3D modeling. In either case the encoder input will generally also include audio formats and image format such as JPEG, as well as other formats as they become more widespread.

For a specific project, the system designer provides input to the encoder through two different bandwidth values. The first bandwidth is for playback of the original stream while the second is reserved for cPackets and/or sPackets. The second bandwidth value may generally correspond to the minimum upload bandwidth of the producer(s.)

Because, from a practical perspective, there can be wide variations in the available bandwidth even on a particular line, it may be advantageous to use adaptive streaming in some implementations. Accordingly, the encoder may be used to create a number of streamable files each corresponding to a pair of target bandwidths. Each target bandwidth pair (Di,Ui) represents a pair of download and upload bandwidths, which are given to the encoder. The encoder can use appropriate compression settings to generate streamable file(s) Si that will stream properly for that bandwidth pair.

The requisite feature sets and complexity of the encoder will generally be application-specific in order to support, e.g., 3D encoding, 2D encoding etc. The following section discusses 3D encoding for illustrative purposes only, although this process may not be needed in 2D encoding, which is in general simpler.

Figure 5:
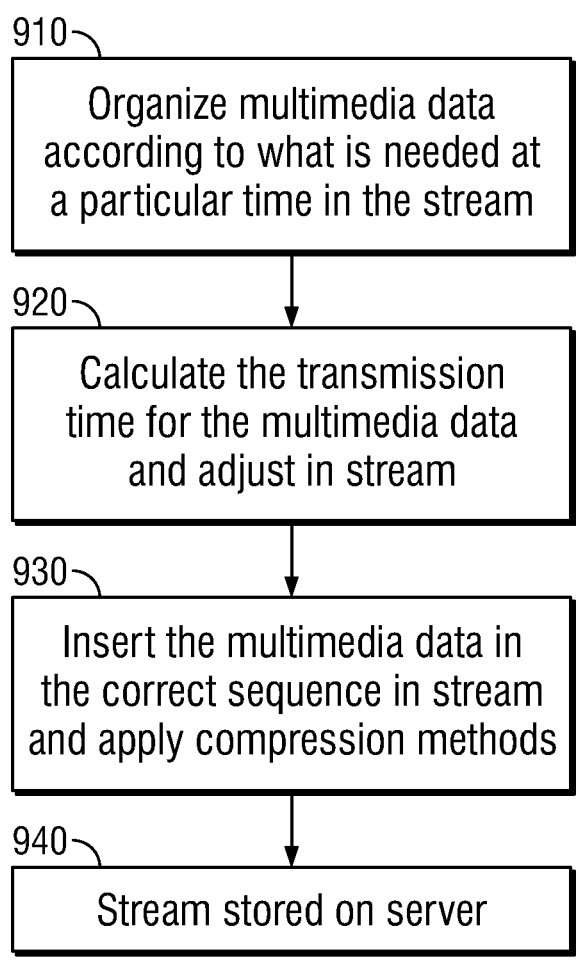
FIG. 5 is a flowchart illustrating how input data for a 3D animation format is transformed into a streamable file.

FIG. 5 is a flowchart illustrating how input data for a 3D animation format is transformed into a streamable file. First, at step 910, multimedia data is organized in accordance to the time it will be needed in the stream. Next, at step 920, the transmission time for the multimedia data is calculated and its location in the stream is adjusted accordingly. The multimedia data is inserted into the stream in the correct sequence at step 930, after which compression methods may be applied. Finally, at step 940, the stream is stored on the server so that it is available for streaming to one or more clients.

In one particular implementation, the encoder may organize all the display procedure calls into a timeline. The encoder then puts the appropriate time indications, or "time stamps," on each of the procedure calls. Using this timeline, the encoder determines the transmission time for the data and parameters, i.e., when these need to be inserted into the stream. One example of how this transmission time may be determined is described in U.S. patent application Ser. No. 09/968,457, which is hereby incorporated by reference in its entirety.

The volume of data transmitted generally increases with the complexity of the scene or sequence. For the sake of efficiency, the encoder may take into account the weight and amount of each data type. Using this information, it then calculates the time needed for the transmission of the multimedia sequence over the playback bandwidth. Knowing both the required transmission time and when the data needs to be displayed permits the encoder to integrate the data at the right time into the stream sequence. If the amount of data is excessive for the playback bandwidth, the encoder may display a warning message.

Figure 6:
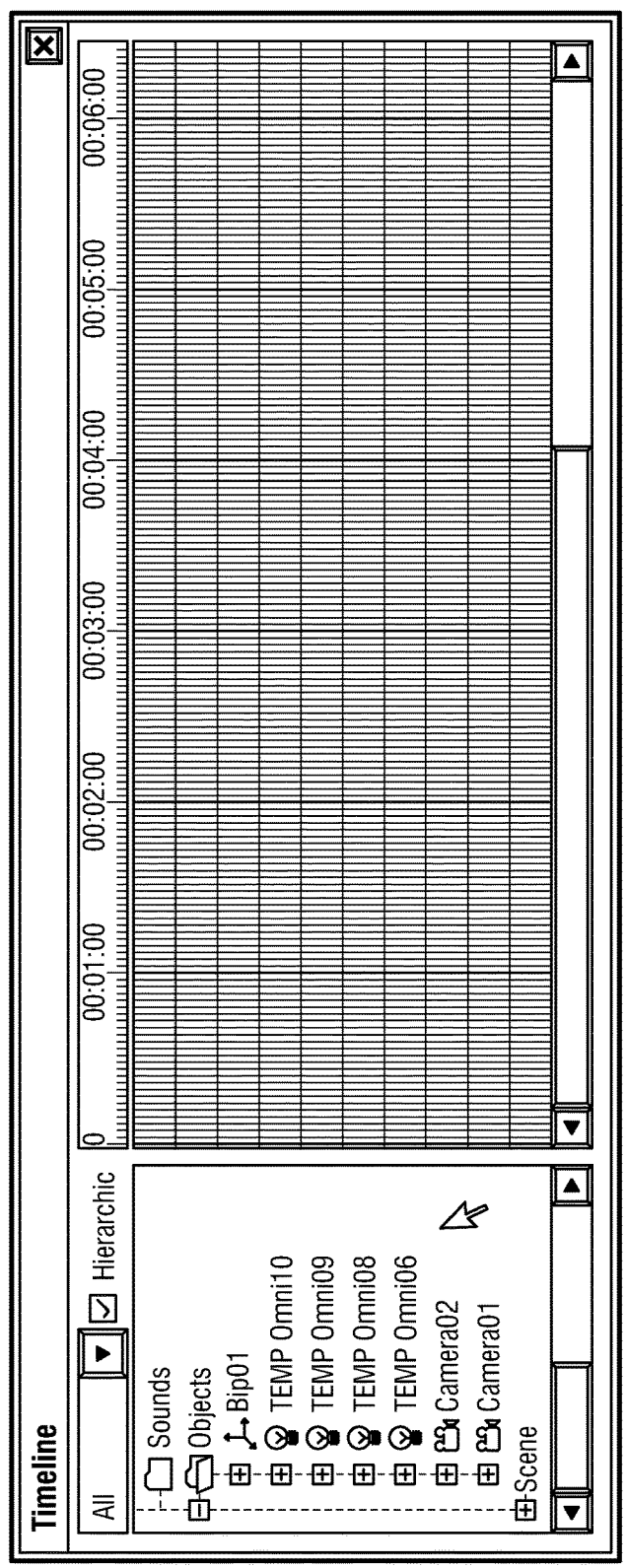
FIG. 6 shows one example of a graphical user interface that may be used on a client device to insert objects based on a timeline.

The virtual streaming file is made up of objects that change over time. FIG. 6 shows one example of a graphical user interface that may be used to insert objects based on a timeline.

The right side of FIG. 6 shows the time in seconds, starting from time zero, of the streaming file. Finer or coarser time granularity can be achieved by clicking and dragging the time window. The left side of FIG. 6 shows the various objects that could make up a streamable file: sounds, mesh, lights, cameras and others.

The timeline can be employed by the tool user as the main editing window of the project. The actual display of the animation, however, may be performed in a separate window called the "playback window." By editing in the timeline window, the user is able to add more instructions or data into the streamable file.

One option that may be supported by the encoder is the ability to insert anywhere in the time line trigger codes and parameters used for capture/recording. An estimate of the size of the recorded data should be performed to make sure it is within the upload capability bandwidth. The size of the recorded information for each object recorded is the product of the sampling rate multiplied by the size of the samples in bits.

Finally, capture scenarios need to be created. These scenarios control which interactive objects and sensor data will be captured and the conditions under which they will be captured. This is important as the resulting products, namely, the original stream(s) with the capture sections need to make sense when both are played back together. If changes in the state of objects are missed, a rendition of the stream being played back may be completely different from the original rendition. These capture scenarios are application-specific and generally can only be created in the context of that application.

Client Side Software—Player-Recorder

The client software, including HTML, CSS and Java Script files, may be automatically downloaded from the Website. User actions typically involve interactive objects. Separate JavaScript routines typically perform the necessary processing for each separate user action, and are triggered by a specific callback when a user interacts with the object using a mouse, keyboard or the like.

JavaScript or other scripting languages may also be used to implement the player and capture software. For simplicity of design, in some embodiment the capture software for user and sensors and the player are integrated together, resulting in a player-recorder tool (PRT).

The PRT software is typically executed when the user requests to view a certain scene/file. The PRT can open a bidirectional connection to the server by creating a Websocket (or equivalent) object and data packets are streamed from the server. Adaptive streaming methods may be used to optimize the downloads and are described in more detail below.

Figure 7:
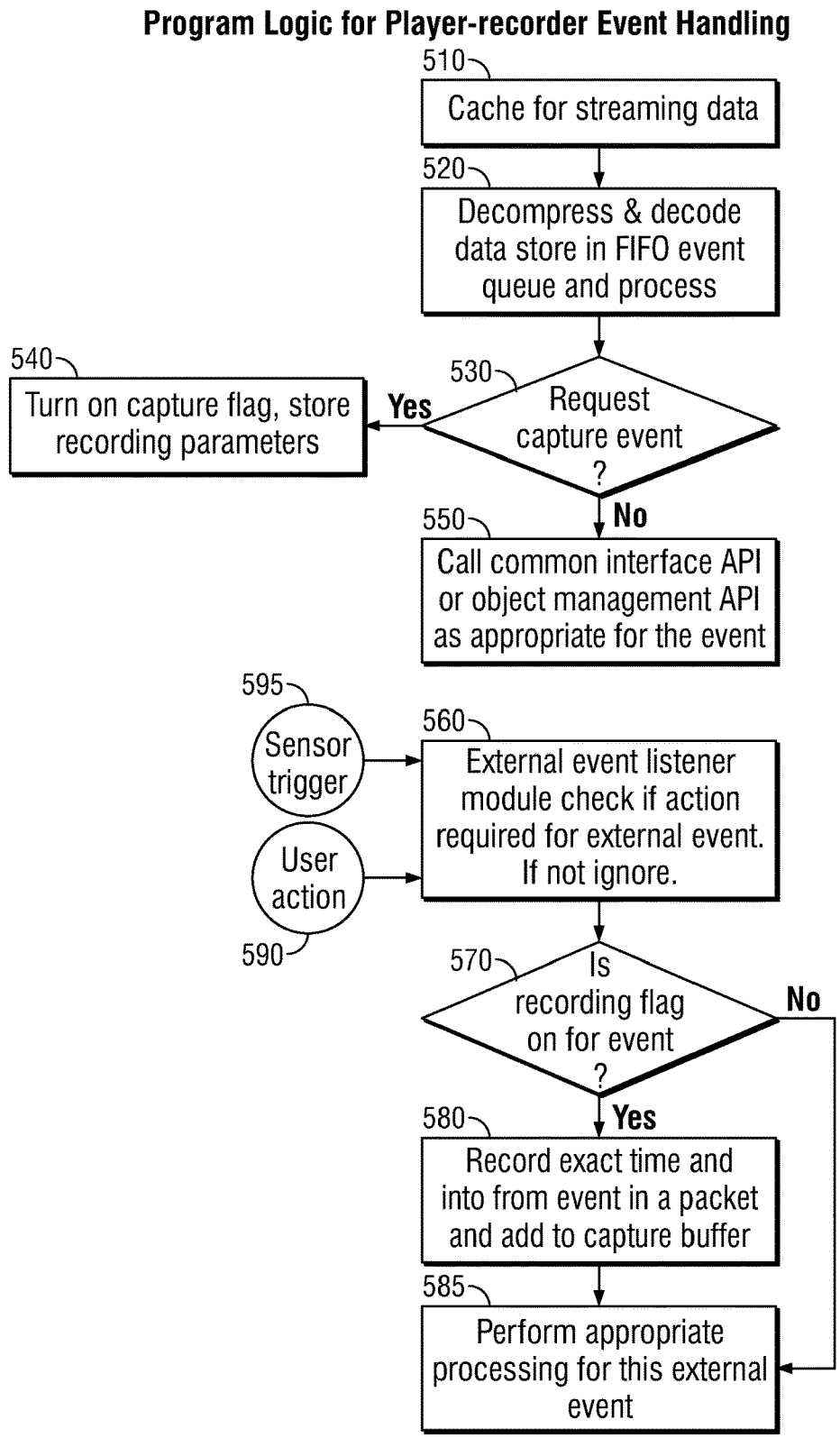
FIG. 7 is a flowchart illustrating the overall flow of a player-recorder tool used to play the streaming content on a client device and capture the producers's actions.

FIG. 7 is a flowchart illustrating the overall flow of the PRT software. At step 510, data packets streamed from the server are stored in a cache section when received. They are then decompressed, decoded and put into an event queue for execution at step 520. An event is defined as the combination of an execution time (time stamp) and a procedure call. The PRT software first checks at decision step 530 whether the event is a Request Capture event. If so, then it turns on the applicable recording flag at step 540 in the capture software module set up and stores any parameters that are specified in the RequestCapture procedure. This requires the underlying PRT software to implement some form of Callback registration or handlers and preferably for specific individual objects like in a 3D or 2D scene. The player software, for example, can quickly check the mouse location versus the location of the object in question.

If the event was not a RequestCapture event, the PRT executes the event at step 550. The event could be a common Interface API call such as for 3D rendering or a data or object management event. These 2 may be treated in separate modules for optimal software design.

The EventListener software module waits for user events 590 or sensor events 595. As shown in FIG. 7 when one of these events occurs the EventListener software checks if the event is of interest at step 560 and ignore it if not. If the event is of interest it checks at step 570 whether the Recording flag has been set for that event, and if not it calls the appropriate Callback routine.

If the Capture flag has been set to on for that event, the PRT software at step 580 records the time of the event using the common playback/capture clock along with any appropriate parameters such as X,Y screen locations and the like, formats all the above data and appends it to the Capture buffer. It then goes on and also calls the appropriate Callback routine.

In some implementations the RPT software may perform some degree of clean up and filtering of the capture buffer at step 585. This may be especially important to prevent excessive or redundant capture, as most windowing operating systems have a tendency to generate a large number of duplicate or very similar calls when tracking user movement. Without any filtering of the captured data, the resulting stream file could exceed the time and bandwidth available Although the capture buffer information will need much cleaning up and optimization for streaming to other users, the buffer at this point is being send to the server and therefore smooth streaming is not a critical issue whereas timing in the PRT is as explained in the next paragraph. Therefore it is best to let the server with its greater capability do the full cleaning up and optimization of the capture buffer.

Currently, JavaScript employed in browsers is single-threaded and that thread not only includes JavaScript but also the UI interface. As a consequence processing is blocked, including user input, until that thread becomes free. This could affect the entire application including capture timing. Therefore the PRT and the application should be carefully optimized, with non-critical processing being performed on the server if feasible.

This timing issue may become less problematic in the future as items like Web Workers become available, which permit limited multi-processing on the browser. Part of the processing of the PRT could be delegated to these items. Also, increases in CPU/GPU speed in the coming years along with further optimization of JavaScript performance should also help address this problem. In the mean time it is also recommended on browsers to avoid overlapping rendering a new scene or doing other heavy processing while capturing inputs so as to minimize the above problem.

As previously discussed, the capture buffer may be formatted as a stream of packets, which include procedures calls for simulating user and sensor inputs. The buffer may be concatenated to a header file containing information on the capture environment (screen resolution, color depth, and so on) that was created during the capture initialization. The resulting file, referred to as a "capture packet" or a "cPacket" file, has a similar architecture to that of the original stream file, and contains time stamps user or sensor actions. The capture packets are also compressed, converted to appropriate format and then sent to the server using a Websocket interface or equivalent. The amount of capture data that is buffered before being sent to the server may be determined based on a number of variables, including the type of application, capture amount and bandwidth issues.

Semantic Packets (sPackets)

In general, a producer will typically create cPackets online with the PlayerRecorder and either create or obtain sPackets offline. In one implementation, the initial user adds the sPackets first, followed by cPackets, so that the cPackets can reflect exactly the user's reaction to the new collaborative virtual environment (CVE) that will be transferred to the other users. In this way, a maximum level of consistency and integrity can be maintained.

As mentioned above, SVSR has the ability to incorporate new objects with their own properties through the use of sPackets. The encoder tool described herein can generate not only the original stream file, but also other files that are consistent with the original stream file. These new files can become basic building blocks for new content and, as noted above, these building blocks are referred to as semantic packets or sPackets. The adjective "semantic" is used to indicate that each packet has a coherent meaning or consistency within the context of the application being designed.

The packets also need to be consistent with each other and with the original stream so that all the files can be combined into a whole that will be comprehensible to the receiving user. For example, in a 3D application there are three major variables that should be consistent for semantic packets to be used interchangeably:

a) time period,
b) camera viewpoint, and
c) geographical separation (spatial orientation).

Often, using several semantic packets will be better than using a single semantic packet because they give the content creator more options when mixing the sPackets, and the choices of options can be made on the fly.

To better illustrate the process described above, an example will be provided of an animation consisting of three semantic packets. The first sPacket consists of a character kicking at something on the ground; each of the two other sPackets consists of an object on the ground and its movements when kicked. If the second sPacket is a ball and the third sPacket is a hat, the targeting machine (i.e., the player) can choose whether the character kicks the ball or the hat.

The system software will translate the player's choice into a request for either "sPacket 1+sPacket 2" or "sPacket 1+sPacket 3." The final combined animation could then be integrated into the original stream file.

Clearly, there must be coherence with regard to the time elapses between these three semantic packets, including the start time, the end time, the time when the character's foot hits the object, the time when the object flies away, and so on.

The "camera's viewpoint" is the perspective from which the drawings of the attributes are rendered. Although the attributes are not actually photographed by a camera, the camera viewpoint analogy provides a readily understood manner of conveying this principle. If attributes are to be used interchangeably in a scene, they must be drawn from the same perspective in order to appear coherent across the different semantic packets.

Geographical separation between the entities in the sPacket can be specified in various ways, for example, by making sure the original positions each object is different from any other object. Similarly, when the designer creates the 3D entities and their movements, the relative positions of elements in a scene can be defined.

It should be understood from the foregoing that the creation of sPackets, unlike that of cPackets, is mostly an off-line creation, requiring some preparation by the designer. However, once the sPackets have been created off-line, selecting sPackets and merging them with a stream can be done in near real time, thus further supporting spontaneous collaboration.

Server Side Software: Encoder-Mixer

Figure 10:
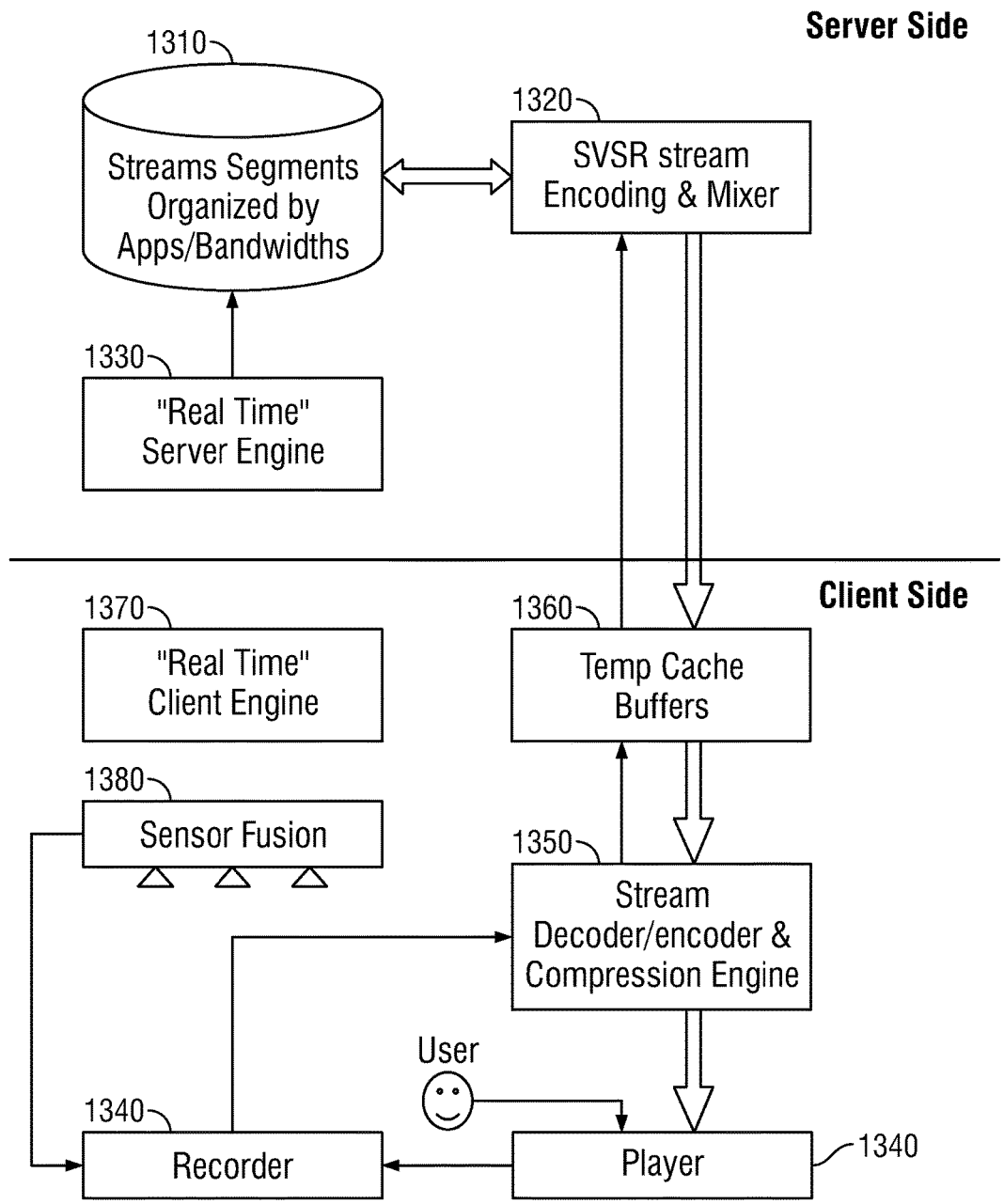
FIG. 10 is a functional block diagram showing one example of a server and client device.

In one implementation the server is made up of several modules as seen in FIG. 10. The Data Base Module contains original streams split into short segments organized by application type, bandwidths and other criteria. It may also contain sPackets. Another module, the stream Encoder and the Mixer, implements parts of SVSR technology as described below. The Real Time Server Engine (RTS) monitors communications and streaming. Additional modules are also provided to handle communications to the Producers and Observers.

In a typical scenario, the initial Producer first makes a request over HTTP to the server for a combination of an original stream, possibly with sPackets configured a specified bandwidth and specific hardware characteristics such as CPU speed and the like. Following this request both the client and the server upgrade HHTP based communication to bi-directional WebSockets for better performance and flexibility.

The Mixer and Stream Encoder work closely together to produce SVSR packets. The stream Encoder focuses on proper formatting of the streams, compression and decompression of the streams and associated functions.

The purpose of the Mixer is to mix two or more streams of packets based on requests from Producers. One of the streams to be merged will typically be an original stream and the other(s) could consist of:
1) only sPackets
2) only cPackets
3) both cPackets and sPackets.

As previously explained, the architecture of SVSR packet streams, including cPackets and sPackets, is essentially a sequence of time stamps packets, therefore the merging of the streams by the Mixer consists of a sorting operation on the time-stamp headers, followed by concatenation of all the packets ordered by increasing time, into one integrated stream.

Sort algorithms are available which can be implemented to take advantage of multi-core CPUs and even make use of a GPU, both of which have become quite common in computer hardware. Moreover, the sorting can accomplished at very high speed, especially because the Mixer runs on the server.

Although mixing or merging streams is a primary goal of the Mixer, the Mixer also taking new streams or newly integrated streams and optimizes them, thus making them more "streaming friendly". As previously mentioned when discussing the Player-Recorder, the captured cPackets may need some cleaning up and filtering due to, among other things, The Player-Recorder can do a very quick first pass before sending the data to the server but due to timing issues during the capture process it cannot do a full optimization. This task is generally reserved to the server.

Another issue that the Mixer addresses arises if the cPackets contain substantial amounts of captured data information, which need to be moved within the stream to a point preceding its actual use. Exactly where in the stream it is moved is based in part on the bandwidth available. The user time stamp trigger points, of course, need to remain the same so as not to affect the recording of the user experience. What does need to be moved ahead in the stream, however, is the associated information parameters and possibly sensor and other data, including photographs and videos, if present, so that they are stored and available when the user trigger points are "reactivated". This is similar to the process shown in FIG. 5, above, and it is a part of the process that maintains smooth streaming when downloading to the next set of users.

In addition, the translation of mouse coordinates, if used, and other data might be needed to make the data more generic for various hardware and software platforms. This is because the resulting integrated file might be played back in a window having different characteristics from the window in which the user data was captured.

Other capabilities of the Mixer may possibly include:
1) Deleting from a stream SVSR entries using any subfields in the Lxxx stamps such as UserIDs, User Session IDs, cPackets or sPackets.
   In other words any entries from a particular user or a particular user session or even more specific cPackets or sPackets can be eliminated from a stream.
2) Eliminating from a stream all Lxxx stamps but keeping the associated Pxxx and subsequent fields. Once all users are agree to the changes/additions to a stream, the Lxxx fields have only historical value, namely, who and how the original stream was modified and thus can be deleted at the right time to minimize stream size.
3) Stripping away from cPackets sensor information, which can be stored in temporary buffers where a separate routine can reformat it appropriately for proper visual display to Producers and Observers.
4) Adjusting for different target platforms. Because of the variety of hardware platforms on the Internet, there can be need for special adjustments or calibration such as stereoscopic 3D, for example. The Mixer can insert or delete the sequence of packets as appropriate.

In this embodiment, the Mixer is capable of understanding even quite complex requests through a powerful API, and is able to generate such virtual streams as:
   a) mixing requests,
   b) concatenation requests, and
   c) precedence of operations requests.

These operations allow great control of the stream generation, and are available with three simple operators:

1) Mixing: A*B mixes streams A and B;
2) Concatenation: A|B generates a stream composed of A, then adds B;
3) Precedence: (((A*B)|(C*D))|E) generates and sets the order of a stream composed of mixing and concatenation requests.

Finally, the mixer can be used to integrate not just cPackets and sPackets in the original stream, but control programming packets, as explained above.

The mixer can typically perform all the above operations at very high speed because they are fundamentally simple operations and the Mixer is running on the server. In some cases some of the functionality of the Mixer may be implemented in hardware micro code due the simple nature of the mixer operations, thereby allowing it to handle an even greater number of users.

The mixer may have additional capabilities to better serve advanced Producers. For this purpose at initialization all producers download the original file(s) from the central server(s). This is an important part of the process, since the original file(s) may tend to be large due to the potential presence of large elements such as textures, jpegs, or large animation sequences. For optimal performance, all the producers should choose similar graphics hardware settings such as resolution, window size, and so on. Although software routines can compensate for such differences, they could still affect either the performance or the quality of the collaboration experience.

For ease of understanding, a simple example will described with a single original file and three producers.

Producer collaboration starts when the first Producer (Producer 1), after interacting with the original stream file and creating a capture file (cPacket1), transmits that capture file to the server(s) to be forwarded to the other two producers. The other two Producers then receive the capture file, which is merged with the original file by the Mixer software, and then streamed and displayed by the targeted producer(s). In this example the other two producers accept the changes, the Mixer deletes the Lxxx stamps and optimizes the stream to create a new "original and seamless" stream that includes the first producer's changes. The new stream is then stored on the server.

Figure 8:
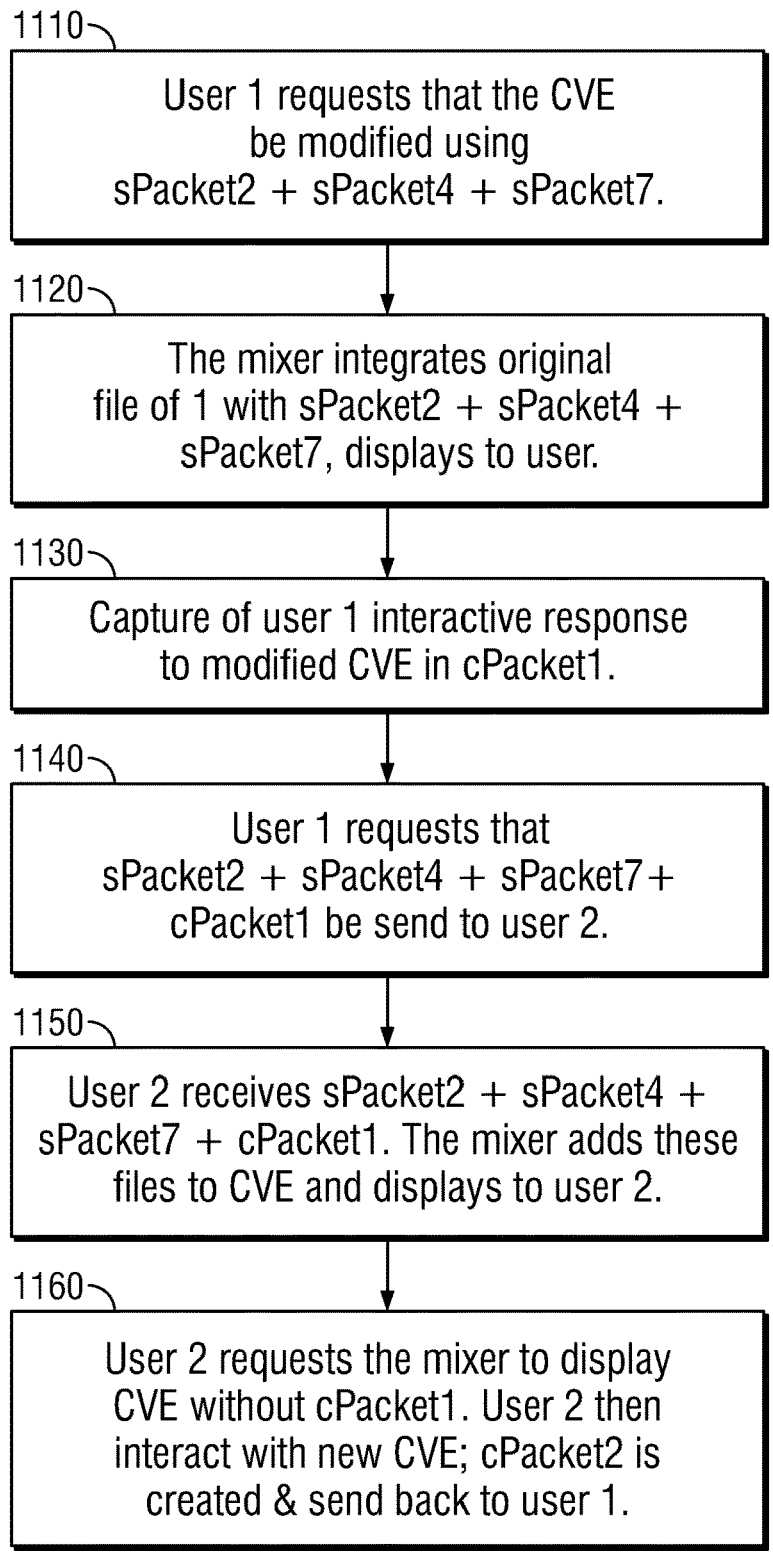
FIG. 8 is a flowchart showing one example of how cPackets and sPackets are mixed by the mixer residing on the server.

The above process can be generalized to handle multiple cPackets and sPackets. In a more advanced embodiment, the Mixer can be implemented in such a way as to permit producers to interact with the Mixer, even requesting it to remove selected sPackets and/or cPackets from the CVE, which is a means of enhancing producer feedback. The flowchart shown in FIG. 8 illustrates a more advanced example of this kind of processing.

First, at step 1120, user 1 requests a modification to the CVE using sPacket2+sPacket4+sPacket7. The Mixer integrates the original file OF1 at step 1120 with sPacket2+sPacket4+sPacket7 and displays it to User 1. At step 1130, the interactive response of User 1 is captured to modify the CVE in cPacket1. User 1 requests that sPacket2+sPacket4+sPacket7+cPacket1 be sent to User 2 at step 1140. At step 1150, User 2 receives sPacket2+sPacket4+sPacket7+cPacket1. The Mixer adds these files to the CVE and displays it to User 2. User 2 requests the Mixer to display the CVE without cPacket1 at step 1160. User 2 then interacts with the new CVE. CPacket2 is created and sent back to User 1.

One of the strengths of SVSR technology is its ability to combine the flexibility and speed of producer collaboration while permitting seamless and optimized final streams. This is an important ability in real-world cases, since producer collaboration with three or more producers tends to be quite complex and messy and the technology needs to be able to handle it correctly.

Figure 9:
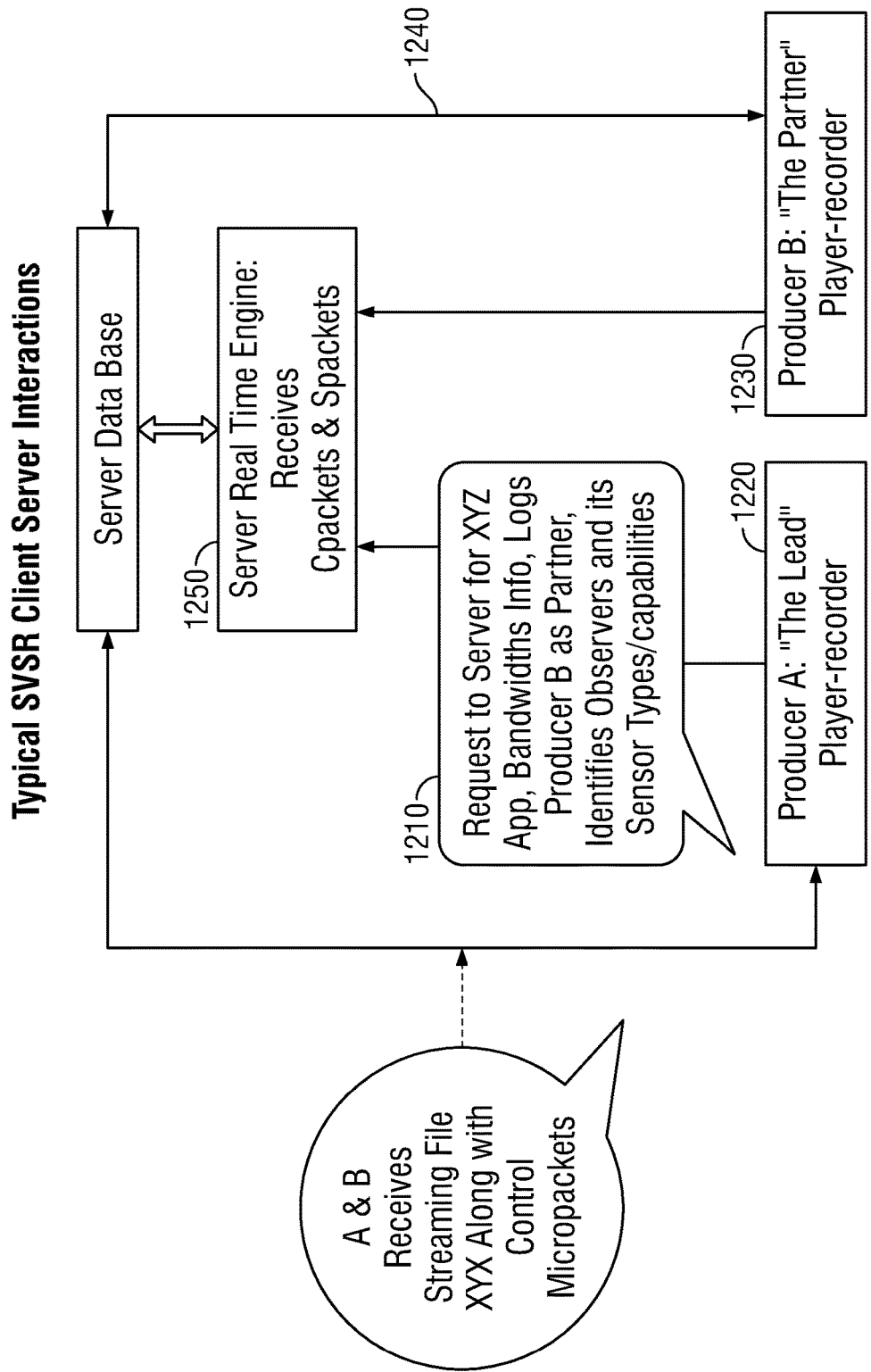
FIG. 9 is a message flow diagram illustrating one example of the interactions between a server and client when streaming interactive media.

Client—Server Interaction in SVSR:

FIG. 9 is a message flow diagram showing some of the steps of SVSR in a typical Client Server Interaction; for the sake of clarity the many internal steps in the server and client engine are simplified in FIGS. 9 and 10. In this example there are two Producers 1220 and 1230 (denoted Producers A and B, respectively) producing simultaneously separate parts of a common production. A concrete example could be a painting or a musical score. As indicated previously, each Producer acts on a different object so as to maintain automatically consistency in the status of the objects. Producer A, after login in and identifying himself as the "LEAD," makes a request at 1210 to the server 1250 for a stream XYZ with a Recording option. Producer A communicates to the server other information such as its download and upload bandwidth, the type of system he has and he also identify Producer B as the partner he will be "producing with". Producer A also identifies the status of any observers for the coming production. This could be for example: 1) No observers allowed 2) some selected observers specified in a list 3) Any/all observers allowed. Other option also could be made to stream/copy directly the coming production to a social network such as Face book. Producer A indicates which objects are assigned to each Producer. For example in the case of a music score, this would be the assignment of musical instruments.

One function of the SVSR engine on the server is to monitor network condition such as bandwidth, the status of the Producers and finally the status of the observers. Unlike Adaptive streaming, where the choice of bandwidth always reside in the client, in SVSR key choices need to be made also by the server as only the server knows the network conditions of all the Producers and Observers. However if a number of choices are possible a possible option is to inform the lead Producer of problems/choices and let him make the final decision. The server 1250, after validating all of the above and making sure Producer B is logged-in and ready, downloads at 1240 stream XYX with the recording option to both Producer A and B.

After both Producers are synchronized, an audio or visual signal is sent to the Producers and the common production is started, cPackets are streamed from Producer A and Producer B to the server 1250 where they are merged together and with the original stream and the result streamed to the Observers. The cPackets may also be streamed between Producers A and B so that both know what the other is doing. This may be a good option, although there will be a small lag time due to the transfer time. During the entire production the SVSR engine in the server 1250 monitors all network conditions for failure or significant delays and can send messages to the Lead with an option to cancel the production in case of significant problems.

FIG. 10 shows some of the component parts of both the SVSR client and server side engines.

The server side includes the play-record programs and streams 1310, stream management 1320, including the stream encoder & the mixer and the real time server SVSR engine (RTS-Engine) 1330. The client side includes the player/recorder 1340, the real time client SVSR engine (RTC-engine) 1370, the SVSR stream decoder/encoder 1350 and temporary buffers 1360.

The degree to which the "real time engines" of the player and server function in real-time or near real-time depends on the particular hardware and software available. For the purposes herein these terms generally mean that the real time engines give their functions very high priority.

The Play-Record programs and streams on the server contain all the necessary files, whether HTML5, CSS, Java Script and data and animations packets streams, to perform streaming playback, interactivity and recording of user actions for a number of applications. Similar to the Dash standard the streams are organized in smaller segments/chunks corresponding to different bandwidths, sensors capabilities and other options.

For each play-record application a number of options may be specified in a manifest file that the RTS-Engine 1330 uses to make its final choice including the bandwidth for download and upload and the associated sampling rate and other key characteristics of the recording.

RTS-Engine 1330 and the RTC-Engine 1350 are responsible for monitoring all the network conditions, including bandwidth and, if necessary, sensor status. Because the RTS-Engine 1330 resides on the server, it will monitor all Producers and, if necessary, the Observers.

As mentioned previously, one attribute of SVSR is its ability to dynamically change the characteristics of the recording by sending a packet from the server to the client(s) with new recording instructions. Network conditions can change, especially over a significant amount of time, and in that case it is important to maintain or even improve the quality of the Producer's recording. The logic in the RTS-Engine 1330, upon detection of a major network condition change, sends a Packet instruction to modify in the appropriate way the recording(s) in progress. In one embodiment this may be performed using a high priority interface that uses WebSockets or the equivalent. This may require some extra software implementation since WebSockets does not directly provide a high priority interface. The logic of the RTS-Engine 1330 is also based on the topology of the Producers, whether simultaneous in time or sequential in time, as this also impacts bandwidth and other network conditions.

Figure 11:
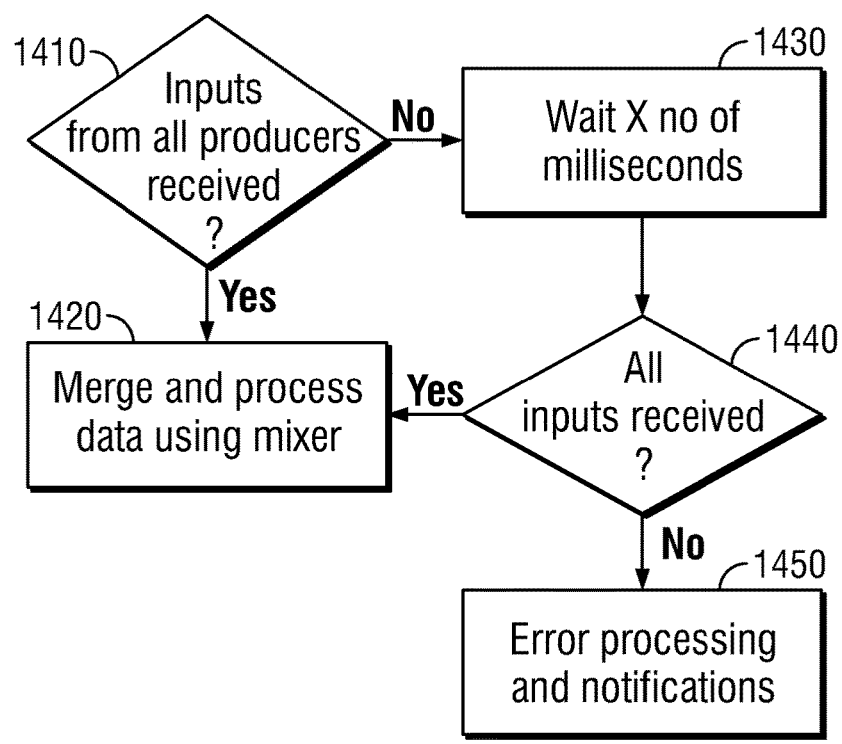
FIG. 11 is a flowchart showing one example of a technique for managing delays that cause the server to wait for receipt of cPackets and/or sPackets from a producer.

When the server is waiting for cPackets and/or sPackets from a number of Producers and one of the Producers is not sending anything, the server cannot distinguish between delays or failure of one of the Internet connections or simply the possibility that one of the users has simply decided to take a break. To address this problem, during any recording sequence the RTC-Engine on each Producer may send at regular intervals synchronization packets. A simplified processing of the above logic is shown in the flowchart of FIG. 11. As shown, at step 1410 the server determines if all the inputs have been received from all the producers. If so, the method proceeds to step 1420 and the server mixes the streams as described above. If at step 1410 the server determines that all the inputs have not been received, the process proceeds to step 1430, in which the server waits for a predetermined time before proceeding to step 1440, where the server once again determines if all the inputs have been received from all the producers. If all the inputs have been received, the method once again proceeds to step 1420. If all the inputs have not been received, an error is indicated at step 1450.

The stream encoder and mixer 1320 on the server are used to encode and mix streams when necessary. This can be done off-line or on-line, depending on the situation. On the client(s) the player-recorder 1340 is used for playback and recording. FIG. 13 also shows the temporary buffers 1360 and the mixer 1370 that are used before data is sent to the player-recorder 1340. The RTC-engine 1350 on the client(s) can also monitor the sensor status using sensor fusion 1380 to organize multiple sensor inputs in a more coherent way for the application.

The RTS engine 1330 on the server can send packet instructions on the high priority line to the client so that the client can turn the sensors on and off and adjust them dynamically in case of problems or because of feedback from observers.

In some implementations the SVSR server may be implemented as a dual hardware server, where server 1 handles Producers and server 2 handles Observers. This is a natural split as the functionality of each server is distinct. Once the final stream(s) are created by server 1 they are dispatched to server 2 for display to the Observers. Some buffering may be performed at this stage to make sure that the playback to the Observers is not "jerky." This may result in a small lag time (e.g., between 0.5 to 5 seconds) between the Producer's actions and the display to Observers. Such a small lag time may generally be acceptable for most applications.

In some cases the final stream(s) may be converted to a video format since no further modifications will be done by the Producers. Converting to video for distribution to some or even all the Observers can be quite practical and cost effective as video can be easily and quickly streamed anywhere, with large social media like Facebook a natural target.

Observers may have the option to send comments, or iconic sounds of approval or disapproval back to the producers. It should be noted that a DASH or equivalent Media Presentation description may be employed since there is a relatively natural mapping from the Play-Record Programs and segments/chunks on Server 1. This DASH or equivalent Media Presentation can also support multi-camera, DRM and other features.

Validation of PlayBack and Capture:

Although many of the cases outlined previously will perform well under good communications and other conditions, there are a number of variables that under other conditions could affect the playback and capture in negative ways. This is particularly true on the Internet, especially the world-wide web (WWW). This is due to the Internet protocols being based on the TCP/IP, which guarantees correct delivery of Internet packets but at the possible cost of serious delays due to traffic, packets collisions and others.

Fortunately SVSR can offer a number of methods to validate the playback and to give a good indication of potential capture problems. Of course the depth and level of validation to be used should depend on the application and the conditions of deployment; this is also true of how to handle problems or errors, so this is why validation is handled in a separate section.

The playback timing is based on the time stamps. Therefore it is easy to check the actual playback time against the timestamps. The player postpones the playback of a packet till the time specified by the timestamps is reached. But if the packet reaches the player after that time, the player has no choice but to execute that packet procedure. Thus by keeping track of the number of "late packet playing", the player can very accurately validate playback. One method that may be used is to calculate:

PlaybackError=SUM(Packets(timevalue[$i$])−Actual-PlaybackTime[$i$]) where $i$=from time=initial time to finaltime Then adjust for length of playback:

PlaybackErrorNormalize=PlaybackError/TotalPlaybacktime

Finding the acceptable maximum threshold level for the above can be determined by actual experimentation since it depends a great deal on the application itself.

The validation of capture packets is more complex because there is no way to know what the absolute capture times should be since they represent unknown quantities. But what can be done is to build test patterns, integrate them as a stream of SVSR packet and check the timings of the capture. This can give a very good indication of capture problems if any.

One way to do this is to use sensors on the system. The vast majority of computer systems are now equipped with a number of sensors that can be triggered when some conditions are reached or at regular intervals. They can be programmed as known quantities in terms of timing and thus they can be compared to the value in the capture stamps. Again, by keeping track of the amount and number of time differences, a good estimate can be made of the probability of correct capture. More advanced methods could include carefully interleaving a time sequence of actual captures with a time sequence of test sensor triggering so as to pick up even short random problems. Of course, in SVSR the automatic tests that are performed may be somewhat ambiguous. Accordingly there is always the option of conducting human validation by a user looking at the results and making modifications in the capture process as was explained previously.

Illustrative Applications

While there are many possible applications for SVSR technology, two broad classes of applications will be described below.

The first class of applications relates to entertainment and education. Producers naturally map into Performers and Observers become Spectators. The architecture of SVSR naturally support a far larger number of spectators than performers and this, added with an easy mapping into some form of adaptive video streaming to spectators, makes it natural for the entertainment market. SVSR could lead to Karaoke-type applications on the Web or a Web version of TV entertainment shows like "American Idol," as well as new educational group programs. Examples of other potential applications include animation characters that appear to be "jumping" on the display of a smart phone as the phone is being shaked. Likewise, the characters may be affected in other ways as determined by one or more sensors (motion, temperature, etc) located in, on, or associated with the phone or other mobile device. The entire sequence showing the character as affected by the phone or other mobile device may be shown or broadcast to Observers, with ads or comments inserted during the transitions. Collaborative endeavors in music, painting and other artistic endeavors for both adults and children are also potential applications.

The second illustrative class of applications for SVSR focuses primarily on the low latency advantage of SVSR and its ability to create cPackets. Typically these applications will have a small number of both Producers and Observers at any one time. Examples of such applications are scientific, training and industrial type of applications An example of a training and testing application involves 3D models of complex pieces of equipment, such as found in factories or oil refineries, which are used to train and test personnel. These applications often need to be able to simulate real world conditions and to accurately measure personnel reaction times and then quickly give the personnel feedback from instructors who may be remotely located.

Another example relates to calibration and measurement applications. These applications involve new sophisticated hardware systems that are usually highly sensitive to reaction time and hence latency issues. An example of such an application is the calibration of a 3D stereoscopic device, as these devices often need individual user adjustments. Other possible applications involve measurements of human reaction time to a stimulus. Again SVSR technology can permit faster monitoring and/or feedback by other users.

Yet another application involves real world matching and sensors. Real world matching applications involve matching virtual streams to real world input. An example is Augmented Reality applications. In these cases virtual streams are adjusted with great precision by end users in order to match the real world as closely as possible. This is especially important in industrial/military/medical/scientific augmented reality applications. For these applications, many of the approximate and/or optimistic software methods that were developed for online games are not acceptable. An example of medical and training applications with sensors is measuring a user reaction after a display of given media streams.

SVSR may be also be advantageously used in security applications because it is capable of targeted streaming and recording user reaction in great detail. Because human beings have an overall cognitive ability above any current computer hardware, the targeted stream can contain information in a form that only the genuine user can recognize and respond to in the appropriate manner. SVSR can record that information, along with critical sensors information, and transmit it back to the server. In these applications temporary streaming buffers should be immediately deleted to protect the information. Recently developed security applications often involve capturing more complex types of user feedback other than simple user actions such the typing of passwords. These security applications can also benefit from SVSR technology.

CONCLUSION

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

In other examples the claimed subject matter may implemented using one or more processors, digital signal processors (DSPs), application specific integrated circuits (ASICs), field programmable gate arrays (FPGAs), discrete logic, or any combinations thereof. When the claimed subject matter is implemented partially in software, a device may store instructions for the software in a suitable, non-transitory computer-readable storage medium and may execute the instructions in hardware using one or more processors to perform the techniques of this disclosure.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The terms "module," "program," and "component" may be used to describe an aspect of a computing system that is implemented to perform one or more particular functions. In some cases, such a module, program, or component may be instantiated via logic subsystems executing instructions held by storage subsystems. It is to be understood that different modules, programs, and/or components may be instantiated from the same application, service, code block, object, library, routine, API, function, etc. Likewise, the same module, program, and/or component may be instantiated by different applications, services, code blocks, objects, routines, APIs, functions, etc. The terms "module," "program," and "component" are meant to encompass individual or groups of executable files, data files, libraries, drivers, scripts, database records, etc.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Although the subject matter has been described in language specific to structural features and/or methodological acts, it is to be understood that the subject matter defined in the appended claims is not necessarily limited to the specific features or acts described above.

COPYRIGHT NOTIFICATION

Portions of this patent application contain materials that are subject to copyright protection

The invention claimed is:

1. A method for streaming interactive multimedia between clients, comprising:
    streaming from a server to a first client device a first series of packets, the packets including data, instructions and timestamps for executing the instructions, at least one of the instructions in at least one of the packets requesting capture of one or more client-based events that are to be communicated back to the server;
    receiving from the first client device a second series of packets that include one or more captured client-based events generated in response to the instructions requesting capture of one or more client-based events, the second series of packets further including one or more timestamps associated with the each of the client-based events;
    calculating a playback timing error for the first streamed series of packets using timing information sent in the second series of packets and disregarding any of the second series of packets if the playback timing error is not within an allowed range;
    merging the first series of packets with the second series of packets that have not been disregarded based on the time-stamps included with the first and second series of packets while deleting any redundant or unnecessary information to thereby form a merged series of packets and moving any packets within the merged series of packets as needed to preserve a streaming performance of the first series of packets; and
    streaming the merged series of packets to a second client device;
    integrating a test pattern into the first series of packets to further validate a timing accuracy of the packets in the second series of packets that include the one or more client-based events; and
    wherein the instructions in the first series of packets include time stamped Remote Procedure Calls (RPC) that include time stamps, procedure identification with a request ID.

2. The method of claim 1 further comprising:
    receiving from the first client device a third series of packets that include one or more captured client-based events that are asynchronously generated and not generated in response to the instructions requesting capture of one or more client-based events, the client-based packets further including one or more timestamps associated with the each of the client-based events; and
    merging the first, second and third series of packets based on the time-stamps included with the first, second and third series of packets and the client-based packets while deleting any redundant or unnecessary information to thereby form the merged series of packets and moving any packets within the merged series of packets as needed to preserve a streaming performance of the first series of packets.

3. The method of claim 1 wherein the captured client-based events in the second series of packets are deliverable to one or more third parties that are able to interactively modify capture requests and parameters in the first series of packets sent by the server and rerun in an entirety the streaming, receiving and merging.

4. The method of claim 1 wherein the third series of client-based packets are deliverable to one or more third parties that are able to rerun in an entirety the streaming, receiving and merging.

5. The method of claim 1 wherein the time stamped Remote Procedure Calls (RPC) include at least one parameter selected from the group including a client ID, session ID, one or more object IDs and one or more data buffers not identified by an ID.

6. The method of claim 1 wherein merging the first and second series of packets further includes removing selected entries from the client based instructions before streaming the merged series of packets to the second client.

7. The method of claim 6 wherein the selected entries include the user and/or session identifier.

8. The method of claim 1 further comprising:
    receiving from the second client device a fourth series of packets that include one or more captured client-based events generated in response to the instructions requesting capture of one or more client-based events, the fourth series of packets further including one or more timestamps associated with the each of the client-based events;
    merging the fourth series of packets with the first and second series of packets based on the time-stamps included with the first, second and fourth series of packets while deleting any redundant or unnecessary information to thereby form the merged series of packets and moving any packets within the merged series of packets as needed to preserve a streaming performance of the first series of packets.

9. The method of claim 1 wherein the client-based event further includes information reflective of one or more states of the first client device.

10. The method of claim 1 wherein streaming the first series of packets to the client further includes streaming the first series of packets in accordance with an adaptive streaming technique.

11. The method of claim 10 further comprising adaptively streaming the first series of packets to the client to dynamically match a data rate of the second series of packets being received from the first client device.

12. The method of claim 1 wherein the data included in the first series of packets includes at least one interactive media object.

13. The method of claim 1 wherein the one more timestamps included with the second series of packets is generated by a clock that also controls playback of the first series of packets on the first client device.

14. The method of claim 1 wherein the merging further includes converting the merged series of packets to a video format that conforms to a standard video protocol.

15. The method of claim 1 wherein the instructions requesting capture of one or more client-based events include one or more parameters specifying recording settings used for capturing the client-based events.

16. The method of claim 1 wherein the captured client-based events are stored in a buffer and the buffered client-based events are periodically formatted for streaming to the server.

17. The method of claim 1 wherein merging the first and second series of packets includes sorting the instructions in an order based at least in part on the timestamps included with the first and second series of packets.

18. The method of claim 1 wherein merging the first and second series of packets includes translating the client-based events includes translating the client-based events into procedure calls executable by the second client device.

19. The method of claim 1 wherein the client-based events include user-input received by the first client device.

20. The method of claim 1 wherein the client-based events include sensor data provided by one or more sensors associated with the first client device.

21. The method of claim 1 further comprising dynamically revising the instructions based at least in part on the second series of packets received from the first client device.

* * * * *